US012457321B2

(12) United States Patent
Lee et al.

(10) Patent No.: US 12,457,321 B2
(45) Date of Patent: Oct. 28, 2025

(54) PREDICTION METHOD AND DEVICE USING REFERENCE BLOCK

(71) Applicants: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Goyang-si (KR); HANBAT NATIONAL UNIVERSITY INDUSTRY-ACADEMIC COOPERATION FOUNDATION, Daejeon (KR)

(72) Inventors: Jin-Ho Lee, Daejeon (KR); Sung-Chang Lim, Daejeon (KR); Jung-Won Kang, Daejeon (KR); Hyunsuk Ko, Daejeon (KR); Ha-Hyun Lee, Seoul (KR); Dong-San Jun, Daejeon (KR); Seung-Hyun Cho, Daejeon (KR); Hui-Yong Kim, Daejeon (KR); Jae-Gon Kim, Goyang-si (KR); Do-Hyeon Park, Goyang-si (KR); Hae-Chul Choi, Daejeon (KR)

(73) Assignees: ELECTRONICS AND TELECOMMUNICATIONS RESEARCH INSTITUTE, Daejeon (KR); INDUSTRY-UNIVERSITY COOPERATION FOUNDATION KOREA AEROSPACE UNIVERSITY, Goyang-si (KR); HANBAT NATIONAL UNIVERSITY INDUSTRY-ACADEMIC COOPERATION FOUNDATION, Daejeon (KR)

( * ) Notice: Subject to any disclaimer, the term of this patent is extended or adjusted under 35 U.S.C. 154(b) by 0 days.

(21) Appl. No.: 16/494,330

(22) PCT Filed: Mar. 22, 2018

(86) PCT No.: PCT/KR2018/003393
§ 371 (c)(1),
(2) Date: Sep. 16, 2019

(87) PCT Pub. No.: WO2018/174618
PCT Pub. Date: Sep. 27, 2018

(65) Prior Publication Data
US 2020/0084441 A1  Mar. 12, 2020

(30) Foreign Application Priority Data

Mar. 22, 2017 (KR) ........................ 10-2017-0036267
Mar. 22, 2018 (KR) ........................ 10-2018-0033279

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/176* (2014.11); *H04N 19/51* (2014.11)

(58) Field of Classification Search
CPC .... H04N 19/176; H04N 19/51; H04N 19/103; H04N 19/105; H04N 19/124; H04N 19/13; H04N 19/139; H04N 19/86; H04N 19/52
See application file for complete search history.

(56) References Cited

U.S. PATENT DOCUMENTS 9,025,893 B2    5/2015  Lee et al.
9,641,844 B2    5/2017  Kim et al.
(Continued)

FOREIGN PATENT DOCUMENTS

KR    10-2012-0005927 A    1/2012
KR       10-1379185 B1    3/2014
WO    WO 2011/142815 A1   11/2011

OTHER PUBLICATIONS

International Search Report issued on Jun. 28, 2018 in counterpart International Patent Application No. PCT/KR2018/003393 (3 pages in English and 3 pages in Korean).
(Continued)

*Primary Examiner* — Anner Holder
(74) *Attorney, Agent, or Firm* — NSIP Law

(57) ABSTRACT

Disclosed herein are a video decoding method and apparatus and a video encoding method and apparatus. In the encoding and decoding of a video, a prediction mode may be selected from among multiple prediction modes using prediction mode information for a target block, and prediction may be performed on the target block based on the selected prediction mode, wherein the prediction mode information includes information related to a reference block, and
(Continued)

wherein the reference block comprises one or more of a spatially neighboring block that is spatially adjacent to the target block and a temporally neighboring block that is temporally adjacent to the target block. When the selected prediction mode includes a plurality of prediction modes, a prediction mode to be used for prediction of the target block may be decided on among the plurality of selected prediction modes through signaling of the prediction mode decision information.

18 Claims, 23 Drawing Sheets

(51) Int. Cl.
*H04N 19/176* (2014.01)
*H04N 19/51* (2014.01)

(56) References Cited

U.S. PATENT DOCUMENTS

| | | | |
|---|---|---|---|
| 2004/0086047 A1* | 5/2004 | Kondo | H04N 19/521 |
| | | | 375/240.16 |
| 2008/0310502 A1 | 12/2008 | Kim et al. | |
| 2009/0016443 A1 | 1/2009 | Kim et al. | |
| 2011/0080954 A1* | 4/2011 | Bossen | H04N 19/52 |
| | | | 375/240.16 |
| 2011/0176611 A1 | 7/2011 | Huang et al. | |
| 2012/0082210 A1* | 4/2012 | Chien | H04N 19/96 |
| | | | 375/240.02 |
| 2012/0243609 A1* | 9/2012 | Zheng | H04N 19/147 |
| | | | 375/240.15 |
| 2012/0269271 A1* | 10/2012 | Chen | H04N 19/597 |
| | | | 375/E7.243 |
| 2013/0077689 A1* | 3/2013 | Lim | H04N 19/513 |
| | | | 375/240.15 |
| 2013/0142259 A1* | 6/2013 | Lim | H04N 19/176 |
| | | | 375/240.12 |
| 2013/0163669 A1* | 6/2013 | Lim | H04N 19/573 |
| | | | 375/240.15 |
| 2013/0272412 A1* | 10/2013 | Seregin | H04N 19/593 |
| | | | 375/240.16 |
| 2014/0153647 A1* | 6/2014 | Nakamura | H04N 19/52 |
| | | | 375/240.14 |
| 2014/0205014 A1* | 7/2014 | Nakamura | H04N 19/577 |
| | | | 375/240.16 |
| 2014/0301461 A1* | 10/2014 | Jeon | H04N 19/43 |
| | | | 375/240.12 |
| 2014/0376638 A1* | 12/2014 | Nakamura | H04N 19/174 |
| | | | 375/240.16 |
| 2015/0264351 A1* | 9/2015 | Miyoshi | H04N 19/107 |
| | | | 375/240.13 |
| 2015/0382008 A1* | 12/2015 | Lim | H04N 19/109 |
| | | | 375/240.16 |
| 2016/0021389 A1* | 1/2016 | Suzuki | H04N 19/159 |
| | | | 375/240.16 |
| 2016/0112717 A1 | 4/2016 | Samuelsson et al. | |
| 2016/0286230 A1 | 9/2016 | Li et al. | |
| 2016/0286232 A1* | 9/2016 | Li | H04N 19/52 |
| 2016/0366435 A1* | 12/2016 | Chien | H04N 19/51 |
| 2016/0373688 A1* | 12/2016 | Imajo | H04N 19/157 |
| 2017/0180738 A1* | 6/2017 | Park | H04N 19/107 |
| 2017/0214932 A1* | 7/2017 | Huang | H04N 19/537 |
| 2018/0192071 A1* | 7/2018 | Chuang | H04N 19/517 |
| 2018/0324454 A1* | 11/2018 | Lin | H04N 19/159 |
| 2018/0359470 A1* | 12/2018 | Lee | H04N 19/198 |
| 2019/0191171 A1* | 6/2019 | Ikai | H04N 19/51 |
| 2020/0260102 A1* | 8/2020 | Lin | H04N 19/70 |
| 2021/0195185 A1* | 6/2021 | Raut | H04N 19/176 |

OTHER PUBLICATIONS

Bross, et al. "High efficiency video coding (HEVC) text specification draft 10 (for FDIS & last call)." *Joint Collaborative Team on Video Coding (JCT-VC) of ITU-T SG 16 WP 3 and ISO/IEC JTC 1/SC 29/WG 11, 12th Meeting*, Geneva,(Jan. 2013). (310 pages in English).

Chen, et al. "Algorithm Description of Joint Exploration Test Model 3." *Joint Video Exploration Team (JVET) of ITU-T SG16 WP 3 and ISO/IEC JTC 1/SC 29/WG 11 3$^{rd}$ Meeting*: Geneva, CH, May 26-Jun. 1, 2016 (37 pages in English).

Satoshi Shimada, et al. "*Non-CE9/13: Averaged Merge Candidate*", JCT-VC of ITU-TSG 16 WP 3 and ISO/IEC JTC 1/SC 29/WG 11, JOTVC-G195, 7$^{th}$ Meeting: Geneva, Nov. 8, 2011 (12 pages in English).

* cited by examiner

| MERGE IDENTIFIER | MATCHING PREDICTION IDENTIFIER | CONDITION | MATCHING MODE IDENTIFIER | |
|---|---|---|---|---|
| 1 | 1 | B-SLICE | 1 | TEMPLATE MATCHING MODE |
| | | | 0 | BILATERAL MATCHING MODE |
| | | P-SLICE | X | TEMPLATE MATCHING MODE |
| | 0 | X | X | MERGE MODE |
| X | X | X | X | X |

FIG. 17

| MERGE IDENTIFIER | MATCHING PREDICTION IDENTIFIER | |
|---|---|---|
| 1 | 1 | TEMPLATE MATCHING MODE |
| | 0 | MERGE MODE |
| 0 | X | X |

FIG. 18

| MERGE IDENTIFIER | MATCHING PREDICTION IDENTIFIER | |
|---|---|---|
| 1 | 1 | BILATERAL MATCHING MODE |
| | 0 | MERGE MODE |
| 0 | X | X |

FIG. 19

PREDICTION METHOD AND DEVICE USING REFERENCE BLOCK

TECHNICAL FIELD

The following embodiments relate generally to a video decoding method and apparatus and a video encoding method and apparatus, and more particularly, to a method and apparatus for performing prediction using a reference block when encoding and decoding a video.

This application is a U.S. National Stage Application of International Application No. PCT/KR2018/003393 filed on Mar. 22, 2018, which claims the benefit of Korean Patent Application Nos. 10-2017-0036267 and 10-2018-0033279, filed on Mar. 22, 2017 and Mar. 22, 2018, respectively, in the Korean Intellectual Property Office, the entire disclosures of which are incorporated herein by reference for all purposes.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or videos.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is continually required.

An image encoding/decoding apparatus and method may use inter-prediction technology, intra-prediction technology, entropy-coding technology, etc. so as to perform encoding/decoding on a high-resolution and high-definition image. Inter-prediction technology may be technology for predicting the value of a pixel included in a current picture using temporally previous pictures and/or temporally subsequent pictures. Intra-prediction technology may be technology for predicting the value of a pixel included in a current picture using information about pixels in the current picture. Entropy-coding technology may be technology for assigning short code words to frequently occurring symbols and assigning long code words to rarely occurring symbols.

Various prediction methods have been developed to improve the efficiency and accuracy of intra prediction and/or inter prediction. Prediction efficiency may greatly change depending on which one of various applicable prediction methods is to be used for the encoding and/or decoding of a block.

DISCLOSURE

Technical Problem

An embodiment is intended to provide an encoding apparatus and method and a decoding apparatus and method, which perform prediction using information about a reference block.

An embodiment is intended to provide an encoding apparatus and method and a decoding apparatus and method, which perform prediction using information about a spatial reference block and/or a temporal reference block.

Technical Solution

In accordance with an aspect, there is provided an encoding apparatus, including a processing unit for selecting a prediction mode from among multiple prediction modes using prediction mode information for a target block and performing prediction on the target block based on the selected prediction mode, wherein the prediction mode information includes information related to a reference block, and wherein the reference block includes one or more of a spatially neighboring block that is spatially adjacent to the target block and a temporally neighboring block that is temporally adjacent to the target block.

In accordance with another aspect, there is provided a decoding apparatus, including a processing unit for selecting a prediction mode from among multiple prediction modes using prediction mode information for a target block and performing prediction on the target block based on the selected prediction mode, wherein the prediction mode information includes information related to a reference block, and wherein the reference block includes one or more of a spatially neighboring block that is spatially adjacent to the target block and a temporally neighboring block that is temporally adjacent to the target block.

In accordance with a further aspect, there is provided a decoding method, including selecting a prediction mode from among multiple prediction modes using prediction mode information for a target block; and performing prediction on the target block based on the selected prediction mode, wherein the prediction mode information includes information related to a reference block, and wherein the reference block includes one or more of a spatially neighboring block that is spatially adjacent to the target block and a temporally neighboring block that is temporally adjacent to the target block.

The selected prediction mode may include a plurality of prediction modes.

A prediction mode to be used for prediction of the target block may be decided on among the plurality of selected prediction modes using the prediction mode decision information.

The decoding method may further include receiving a bitstream including the prediction mode decision information.

The prediction mode decision information may include one or more pieces of partial prediction mode decision information.

The selected prediction mode may include one or more prediction modes.

At least a part of the one or more pieces of partial prediction mode decision information may be omitted in signaling of the prediction mode decision information, depending on the selected one or more prediction modes.

The prediction mode decision information may include a matching mode identifier.

The selected prediction mode may include the plurality of prediction modes, the matching mode identifier indicates a prediction mode to be used for decoding of the target block, among the plurality of selected prediction modes.

When the selected prediction mode is one prediction mode, the prediction mode decision information may not include the matching mode identifier.

The prediction mode decision information may include a matching prediction identifier.

The matching prediction identifier may indicate whether the prediction modes are selected from among the multiple prediction modes.

Information related to the reference block may include one or more of a motion vector of the reference block, a prediction direction of the reference block, a reference picture index for the reference block, an encoding mode of the reference block, a reference picture list for the reference block, a Picture Order Count (POC) of the reference block, a Quantization Parameter (QP) of the reference block, and a Coded Block Flag (CBF) of the reference block.

The multiple prediction modes may include a template matching mode and a bilateral matching mode.

The reference block may include a plurality of reference blocks.

Motion vectors of the plurality of reference blocks may be derived, consistency between the derived motion vectors may be determined, and the prediction mode may be selected based on the consistency.

One of a template matching mode and a bilateral matching mode may be selected as the prediction mode of the target block via a comparison between the consistency and a threshold.

The prediction mode may be selected from among the multiple prediction modes using a prediction direction.

The prediction direction may be a prediction direction of the target block or a prediction direction of the reference block.

The prediction mode may be selected depending on which one of unidirectional prediction and bidirectional prediction is inter prediction of the target block.

When the inter prediction is the bidirectional prediction, a bilateral matching mode may be selected from among the multiple prediction modes.

When the inter prediction is the unidirectional prediction, a template matching mode may be selected from among the multiple prediction modes.

The prediction mode may be selected from among the multiple prediction modes using a coding parameter of the reference block.

Whether the prediction mode of the reference block is an intra-prediction mode or an inter-prediction mode may be determined depending on the coding parameter of the reference block, and the selected prediction mode is decided on among the multiple prediction modes depending on which one of the intra-prediction mode and the inter-prediction mode is the prediction mode of the reference block.

The prediction mode may be selected from among the multiple prediction modes based on a difference between specific POCs.

Advantageous Effects

There are provided an encoding apparatus and method and a decoding apparatus and method, which perform prediction using information about a reference block.

There are provided an encoding apparatus and method and a decoding apparatus and method, which perform prediction using information about a spatial reference block and/or a temporal reference block.

DESCRIPTION OF DRAWINGS

FIG. 17 illustrates signaling of prediction mode decision information when two prediction modes are selected according to an example;

FIG. 18 illustrates signaling of prediction mode decision information when one prediction mode is selected according to an example;

FIG. 19 illustrates signaling of prediction mode decision information when one prediction mode is selected according to an example;

BEST MODE

Figure 1:
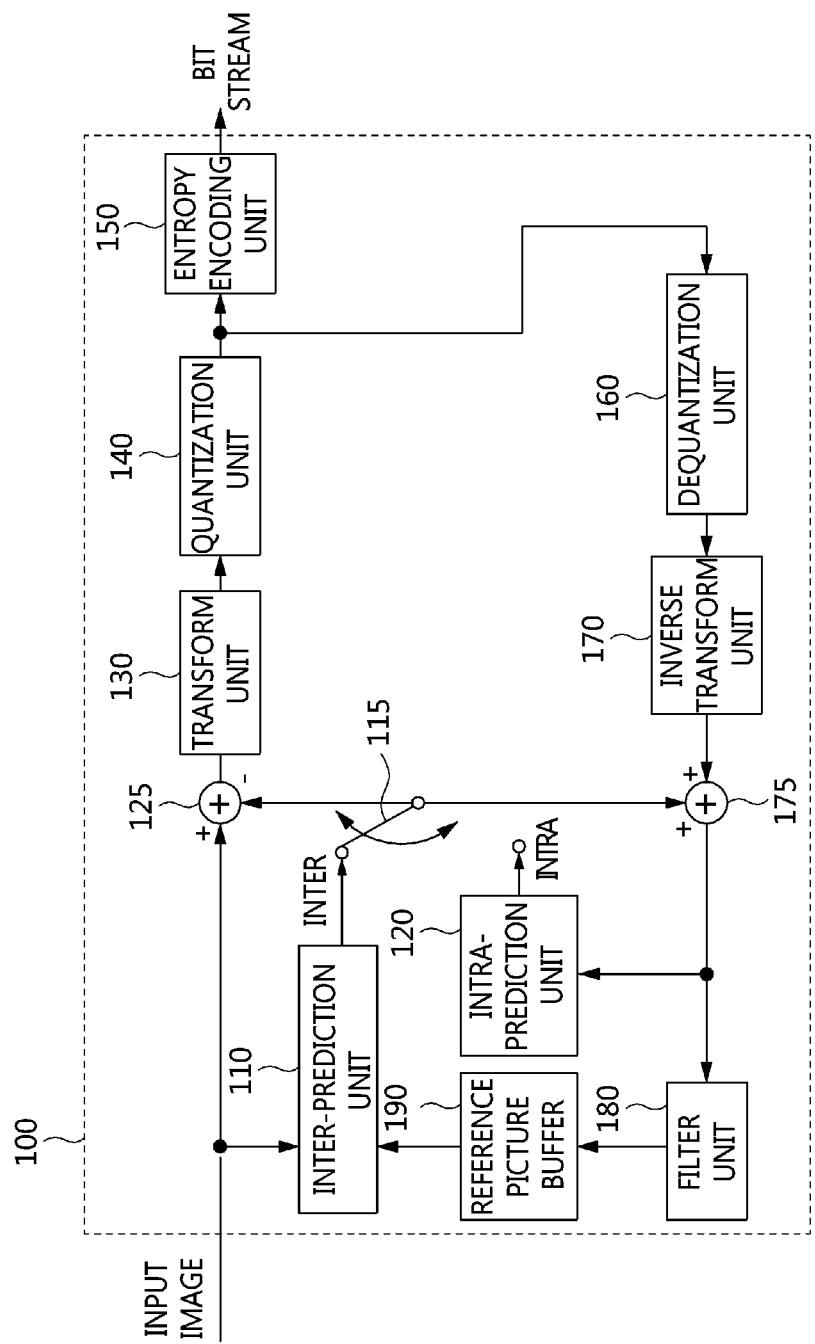
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, it should be noted that, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

Hereinafter, a specific signal may be a signal indicating a specific block. For example, the original signal may be a signal indicating a target block. A prediction signal may be a signal indicating a prediction block. A residual signal may be a signal indicating a residual block.

In the following embodiments, specific information, data, a flag, an element, and an attribute may have their respective values. A value of "0" corresponding to each of the information, data, flag, element, and attribute may indicate a logical false or a first predefined value. In other words, the value of "0", false, logical false, and a first predefined value may be used interchangeably with each other. A value of "1" corresponding to each of the information, data, flag, element, and attribute may indicate a logical true or a second predefined value. In other words, the value of "1", true, logical true, and a second predefined value may be used interchangeably with each other.

When a variable such as $i$ or $j$ is used to indicate a row, a column, or an index, the value of $i$ may be an integer of 0 or more or an integer of 1 or more. In other words, in the embodiments, each of a row, a column, and an index may be counted from 0 or may be counted from 1.

Below, the terms to be used in embodiments will be described.

Encoder: An encoder denotes a device for performing encoding.

Decoder: A decoder denotes a device for performing decoding.

Unit: A unit may denote the unit of image encoding and decoding. The terms "unit" and "block" may be used to have the same meaning, and may be used interchangeably with each other.

"Unit" may be an M×N array of samples. M and N may be positive integers, respectively. The term "unit" may generally mean a two-dimensional (2D) array of samples.

In the encoding and decoding of an image, "unit" may be an area generated by the partitioning of one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of unit, which indicates a coding unit, a prediction unit, a residual unit or a transform unit, the size of a unit, the depth of a unit, the order of encoding and decoding of a unit, etc.

One unit may be partitioned into sub-units, each having a smaller size than that of the relevant unit.

Unit depth: A unit depth may denote the degree to which the unit is partitioned. Further, the unit depth may indicate the level at which the corresponding unit is present when units are represented in a tree structure.

Unit partition information may include a unit depth indicating the depth of a unit. A unit depth may indicate the number of times the unit is partitioned and/or the degree to which the unit is partitioned.

In a tree structure, it may be considered that the depth of a root node is the smallest, and the depth of a leaf node is the largest.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the unit depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree and a binary tree, so as to configure sub-units, such as a coding unit, a prediction unit, and a transform unit.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) means a block adjacent to a target block. The block adjacent to the target block may mean a block, the boundary of which is in contact with the target block, or a block located within a predetermined distance from the target block. The neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block. A neighbor block may be a reconstructed neighbor block.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighboring unit: A reconstructed neighboring unit may be a unit which has already been decoded and reconstructed around a target unit.

A reconstructed neighboring unit may be a unit that is spatially adjacent to the target unit or that is temporally adjacent to the target unit.

A reconstructed spatially neighboring unit may be a unit which is included in a current picture and which has already been reconstructed through encoding and/or decoding.

A reconstructed temporally neighboring unit may be a unit which is included in a reference image and which has already been reconstructed through encoding and/or decoding. The location of the reconstructed temporally neighboring unit in the reference image may be identical to that of the target unit in the current picture, or may correspond to the location of the target unit in the current picture.

Parameter set: A parameter set may be header information in the structure of a bitstream. For example, a parameter set may include a sequence parameter set, a picture parameter set, an adaptation parameter set, etc.

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the following Equation 1. Generally, a combination enabling the rate-distortion cost to be minimized may be selected as the optimal combination in the rate-distortion optimization scheme.

$$D+\lambda *R \qquad [\text{Equation 1}]$$

D may denote distortion. D may be the mean of squares of differences (i.e. mean square error) between original transform coefficients and reconstructed transform coefficients in a transform unit.

R may denote the rate, which may denote a bit rate using related-context information.

$\lambda$ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and inverse transform so as to calculate precise D and R. These procedures may greatly increase the complexity of the encoding apparatus.

Bitstream: A bitstream may denote a stream of bits including encoded image information.

Parameter set: A parameter set may be header information in the structure of a bitstream.

The parameter set may include at least one of a video parameter set, a sequence parameter set, a picture parameter set, and an adaptation parameter set. Further, the parameter set may include information about a slice header and information about a tile header.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction of a target unit. Inter prediction may be one of unidirectional prediction and bidirectional prediction. Alternatively, the inter-prediction indicator may denote the number of reference images used to generate a prediction unit of a target unit. Alternatively, the inter-prediction indicator may denote the number of prediction blocks used for inter prediction or motion compensation of a target unit.

Reference picture index: A reference picture index may be an index indicating a specific reference image in a reference picture list.

Motion vector (MV): A motion vector may be a 2D vector used for inter prediction or motion compensation. A motion vector may mean an offset between an encoding target image/decoding target image and a reference image.

For example, a MV may be represented in a form such as $(mv_x, mv_y)$. $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using merge candidates.

Merge candidate: A merge candidate may be a spatial merge candidate, a temporal merge candidate, a combined merge candidate, a combined bi-prediction merge candidate, a zero-merge candidate, etc. A merge candidate may include motion information such as an inter-prediction indicator, a reference picture index for each list, and a motion vector.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple transform units having smaller sizes.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter is a differential value between a predicted quantization parameter and the quantization parameter of an encoding/decoding target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level in which quantization is applied to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization or dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may be signaled by the encoding apparatus to the decoding apparatus.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode.

Further, the encoding apparatus 100 may generate a bitstream, including information about encoding, via encoding on the target image, and may output the generated bitstream. The generated bitstream may be stored in a computer-readable storage medium and may be streamed through a wired/wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual between the target block and the prediction block.

When the prediction mode is the intra mode, the intra-prediction unit 120 may use pixels of previously encoded/decoded neighboring blocks around the target block as reference samples. The intra-prediction unit 120 may perform spatial prediction on the target block using the reference samples, and may generate prediction samples for the target block via spatial prediction.

The inter-prediction unit 110 may include a motion prediction unit and a motion compensation unit.

When the prediction mode is an inter mode, the motion prediction unit may search a reference image for the area most closely matching the target block in a motion prediction procedure, and may derive a motion vector for the target block and the found area based on the found area.

The reference image may be stored in the reference picture buffer 190. More specifically, the reference image may be stored in the reference picture buffer 190 when the encoding and/or decoding of the reference image have been processed.

The motion compensation unit may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit and the motion compensation unit may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level or a quantized level by quantizing the transform coefficient depending on quantization parameters. The quantization unit 140 may output the quantized transform coefficient level or the quantized level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

For example, the coding parameters may include values or statistical information, such as a prediction mode, a motion vector, a reference picture index, an encoding block pattern, the presence or absence of a residual signal, a transform coefficient, a quantized transform coefficient, a quantization parameter, a block size, and block partition information. The prediction mode may be an intra-prediction mode or an inter-prediction mode.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a transform coefficient level.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one or combinations of the size of a unit/block, the depth of a unit/block, partition information of a unit/block, the partition structure of a unit/block, information indicating whether a unit/block is partitioned in a quad-tree structure, information indicating whether a unit/block is partitioned in a binary tree structure, the partitioning direction of a binary tree structure (horizontal direction or vertical direction), the partitioning form of a binary tree structure (symmetrical partitioning or asymmetrical partitioning), a prediction scheme (intra prediction or inter prediction), an intra-prediction mode/direction, a reference sample filtering method, a prediction block filtering method, a prediction block boundary filtering method, a filter tap for filtering, a filter coefficient for filtering, an inter-prediction mode, motion information, a motion vector, a reference picture index, an inter-prediction direction, an inter-prediction indicator, a reference picture list, a reference image, a motion vector predictor, a motion vector prediction candidate, a motion vector candidate list, information indicating whether a merge mode is used, a merge candidate, a merge candidate list, information indicating whether a skip mode is used, the type of an interpolation filter, the tap of an interpolation filter, the filter coefficient of an interpolation filter, the magnitude of a motion vector, accuracy of motion vector representation, a transform type, a transform size, information indicating whether a primary transform is used, information indicating whether an additional (secondary) transform is used, a primary transform index, a secondary transform index, information indicating the presence or absence of a residual signal, a coded block pattern, a coded block flag, a quantization parameter, a quantization matrix, information about an intra-loop filter, information indicating whether an intra-loop filter is applied, the coefficient of an intra-loop filter, the tap of an intra-loop filter, the shape/form of an intra-loop filter, information indicating whether a deblocking filter is applied, the coefficient of a deblocking filter, the tap of a deblocking filter, deblocking filter strength, the shape/form of a deblocking filter, information indicating whether an adaptive sample offset is applied, the value of an adaptive sample offset, the category of an adaptive sample offset, the type of an adaptive sample offset, information indicating whether an adaptive in-loop filter is applied, the coefficient of an adaptive in-loop filter, the tap of an adaptive in-loop filter, the shape/form of an adaptive in-loop filter, a binarization/inverse binarization method, a context model, a context model decision method, a context model update method, information indicating whether a regular mode is performed, information whether a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, bit depth, information about a luma signal, and information about a chroma signal.

Here, signaling a flag or an index may mean that the encoding apparatus 100 includes an entropy-encoded flag or an entropy-encoded index, generated by performing entropy encoding on the flag or index, in a bitstream, and that the decoding apparatus 200 acquires a flag or an index by performing entropy decoding on the entropy-encoded flag or the entropy-encoded index, extracted from the bitstream.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The coefficient that has been inversely quantized and/or inversely transformed may be added to the prediction block by the adder 175. The inversely quantized and/or inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block.

The reconstructed block may be subjected to filtering through the filter unit 180. The filter unit 180 may apply one or more of a deblocking filter, a Sample Adaptive Offset (SAO) filter, and an Adaptive Loop Filter (ALF) to the reconstructed block or a reconstructed picture. The filter unit 180 may also be referred to as an "in-loop filter".

The deblocking filter may eliminate block distortion occurring at the boundaries between blocks. In order to determine whether to apply the deblocking filter, the number of columns or rows which are included in a block and which include pixel(s) based on which it is determined whether to apply the deblocking filter to a target block may be decided on. When the deblocking filter is applied to the target block, the applied filter may differ depending on the strength of the required deblocking filtering. In other words, among different filters, a filter decided on in consideration of the strength of deblocking filtering may be applied to the target block.

The SAO may add a suitable offset to the values of pixels to compensate for coding error. The SAO may perform, for the image to which deblocking is applied, correction that uses an offset in the difference between an original image and the image to which deblocking is applied, on a pixel basis. A method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to the groups may be determined, and filtering may be differentially performed for respective groups. Information related to whether to apply an adaptive loop filter may be signaled for each CU. The shapes and filter coefficients of ALFs to be applied to respective blocks may differ for respective blocks.

The reconstructed block or the reconstructed image subjected to filtering through the filter unit 180 may be stored in the reference picture buffer 190. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction.

Figure 2:
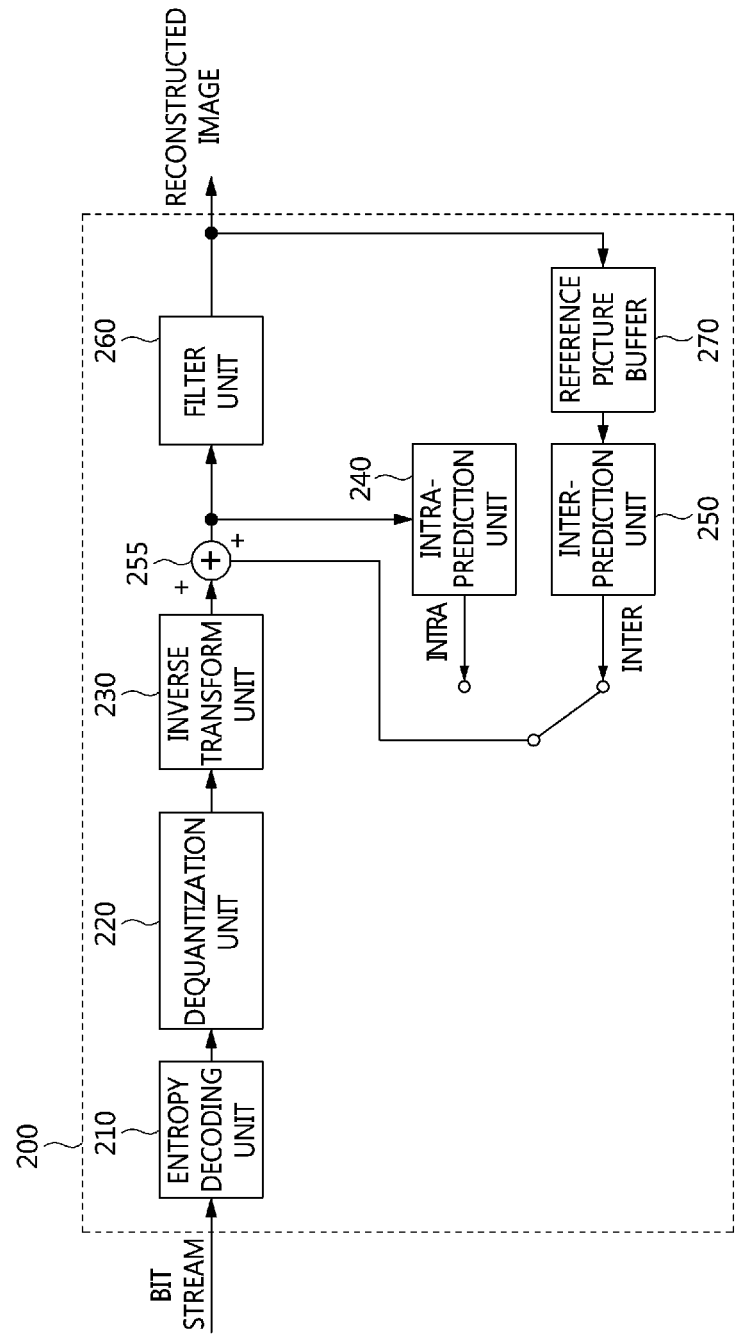
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by a switch. When the prediction mode used for decoding is an intra mode, the switch may be operated to switch to the intra mode. When the prediction mode used for decoding is an inter mode, the switch may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block to the prediction block.

The entropy decoding unit 210 may generate symbols by performing entropy decoding on the bitstream based on the probability distribution of a bitstream. The generated symbols may include quantized level-format symbols. Here, the entropy decoding method may be similar to the above-described entropy encoding method. That is, the entropy decoding method may be the reverse procedure of the above-described entropy encoding method.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighboring blocks around a target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, and an ALF to the reconstructed block or the reconstructed picture.

The reconstructed block subjected to filtering through the filter unit 260 may be stored in the reference picture buffer 270. The reconstructed block subjected to filtering through the filter unit 260 may be a part of a reference picture. In other words, the reference image may be an image composed of reconstructed blocks subjected to filtering through the filter unit 260. The stored reference image may be subsequently used for inter prediction.

Figure 3:
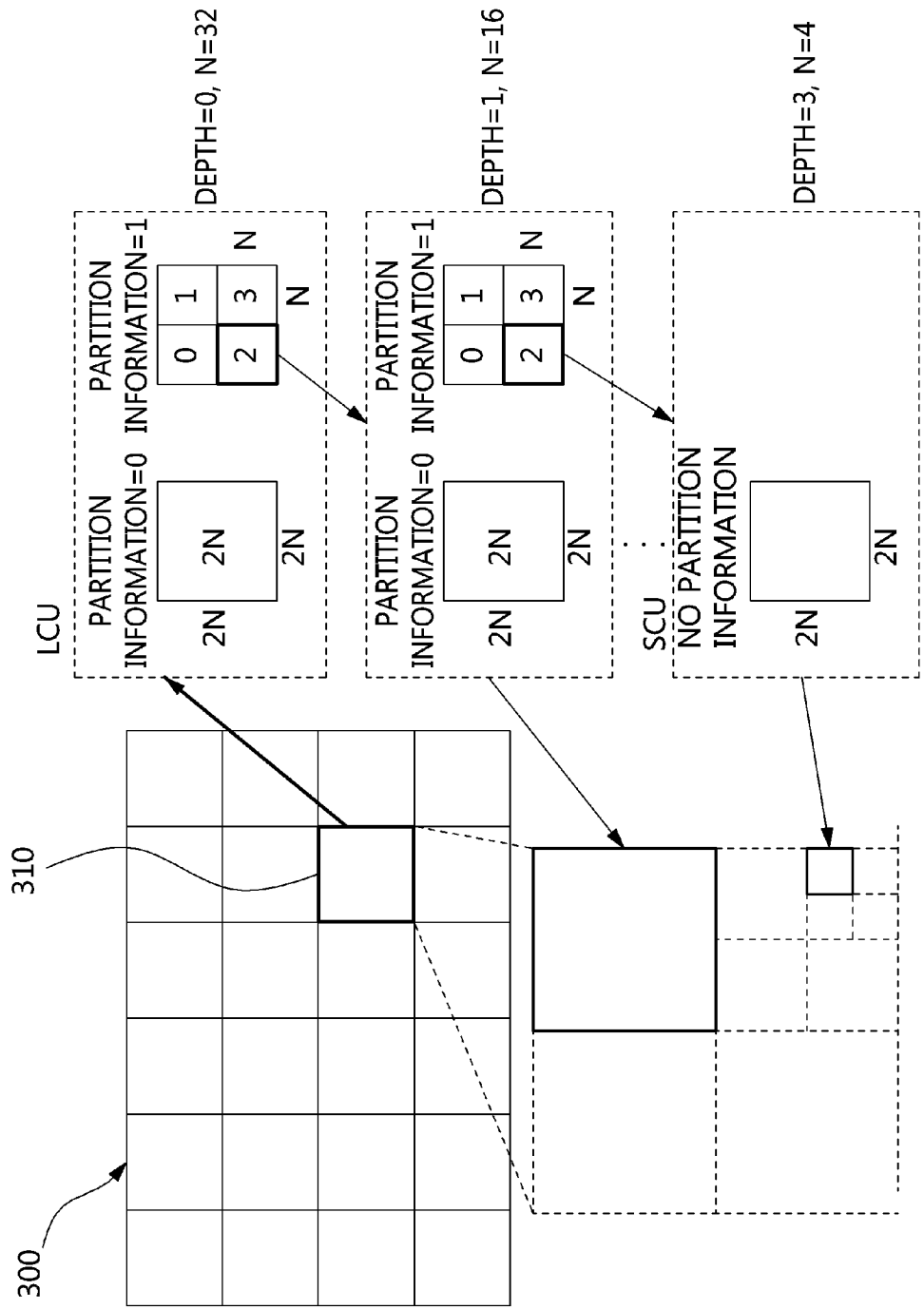
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and the partition structure of the image 300 may be determined according to the LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into sub-units while having depth information based on a tree structure. Each of partitioned sub-units may have depth information. The depth information may be information indicating the size of a CU. The depth information may be stored for each CU. Each CPU may have depth information.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 3, 4, 8, 16, etc. The horizontal size and the vertical size of each of CUs generated by the partitioning may be less than the horizontal size and the vertical size of a CU before being partitioned, depending on the number of CUs generated by partitioning.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size. For example, the depth of an LCU may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be 0. The value of the partition information of a CU that is partitioned may be 1.

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of two partitioned CUs may be 16×32. When a single CU is partitioned into two CUs, it may be considered that the CU has been partitioned in a binary-tree structure.

In addition to quad-tree partitioning, binary-tree partitioning may be applied to the LCU 310 of FIG. 3.

Figure 4:
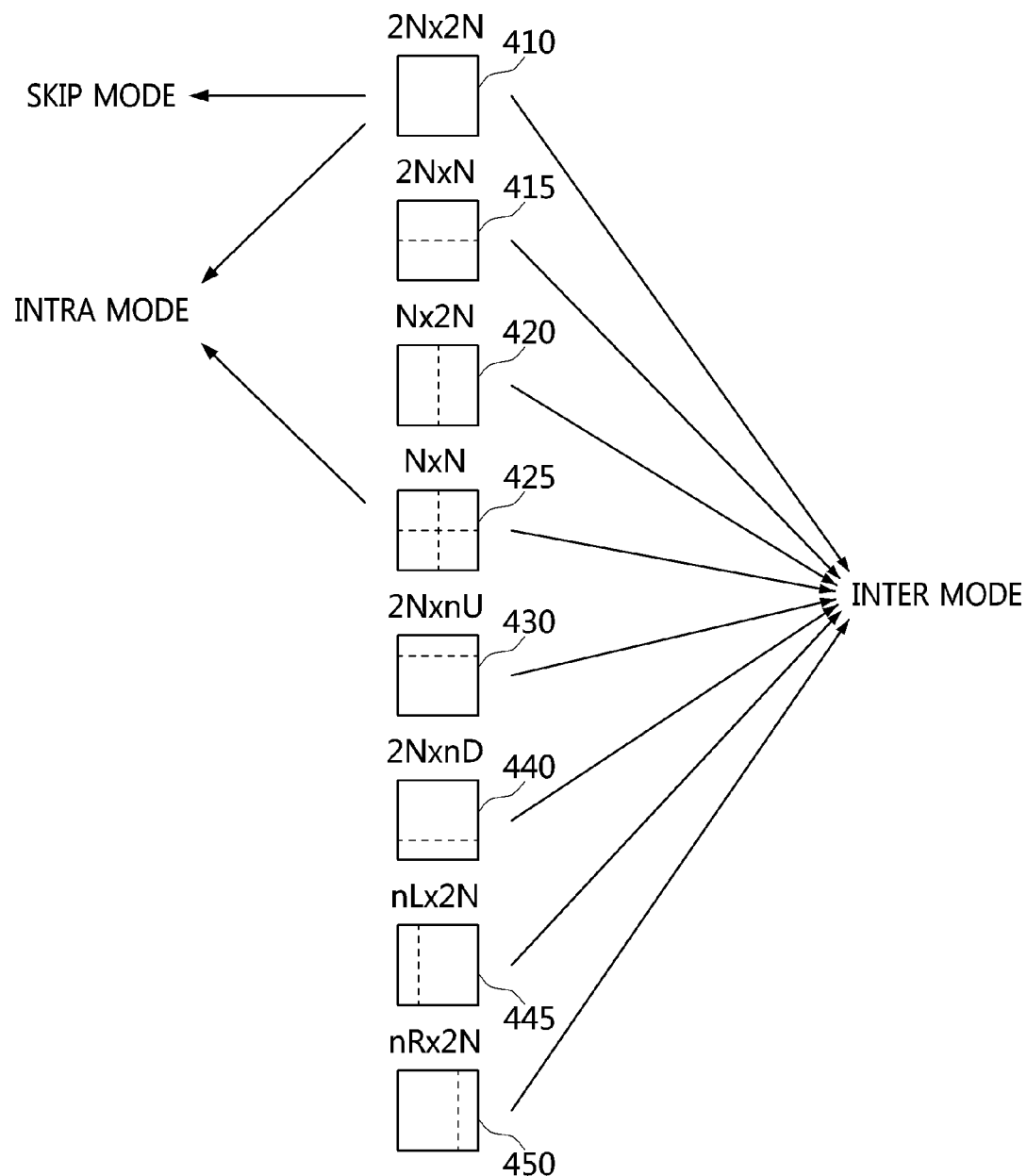
FIG. 4 is a diagram illustrating the form of a Prediction Unit (PU) that a Coding Unit (CU) can include.

FIG. 4 is a diagram illustrating the form of a Prediction Unit (PU) that a Coding Unit (CU) can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410, the N×N mode 425, a 2N×N mode and a N×2N mode may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

Figure 5:
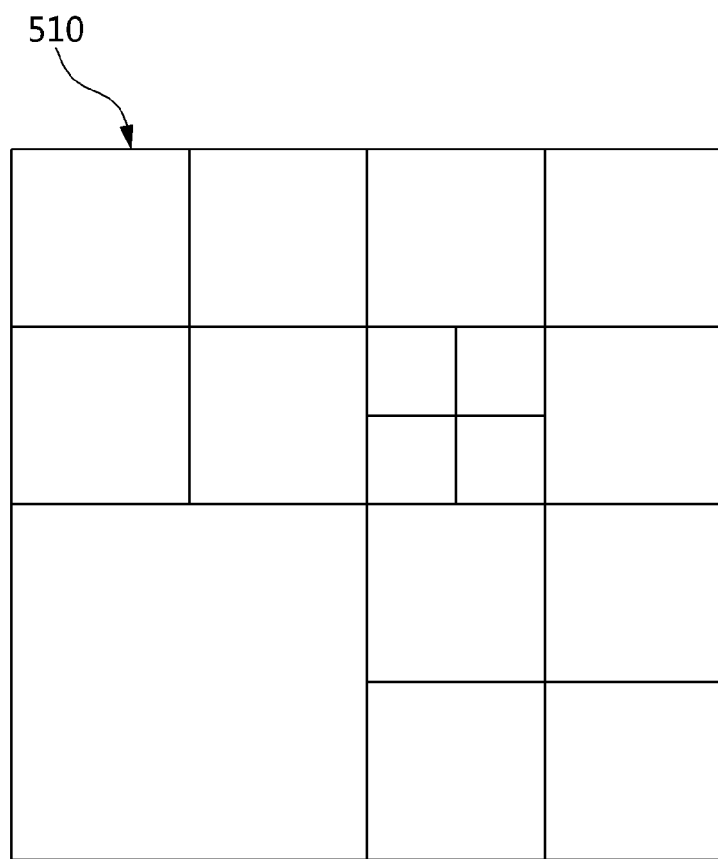
FIG. 5 is a diagram illustrating the form of a Transform Unit (TU) that can be included in a CU.

FIG. 5 is a diagram illustrating the form of a Transform Unit (TU) that can be included in a CU.

A Transform Unit (TU) may have a base unit that is used for a procedure, such as transform, quantization, inverse transform, dequantization, entropy encoding, and entropy decoding, in a CU. A TU may have a square shape or a rectangular shape.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quadtree structure.

A CU may have a given depth. When the CU is partitioned, CUs resulting from partitioning may have a depth increased from the depth of the partitioned CU by 1.

For example, the depth of a CU may have a value ranging from 0 to 3. The size of the CU may range from a size of 64×64 to a size of 8×8 depending on the depth of the CU.

By the recursive partitioning of a CU, an optimal partitioning method that incurs a minimum rate-distortion cost may be selected.

Figure 6:
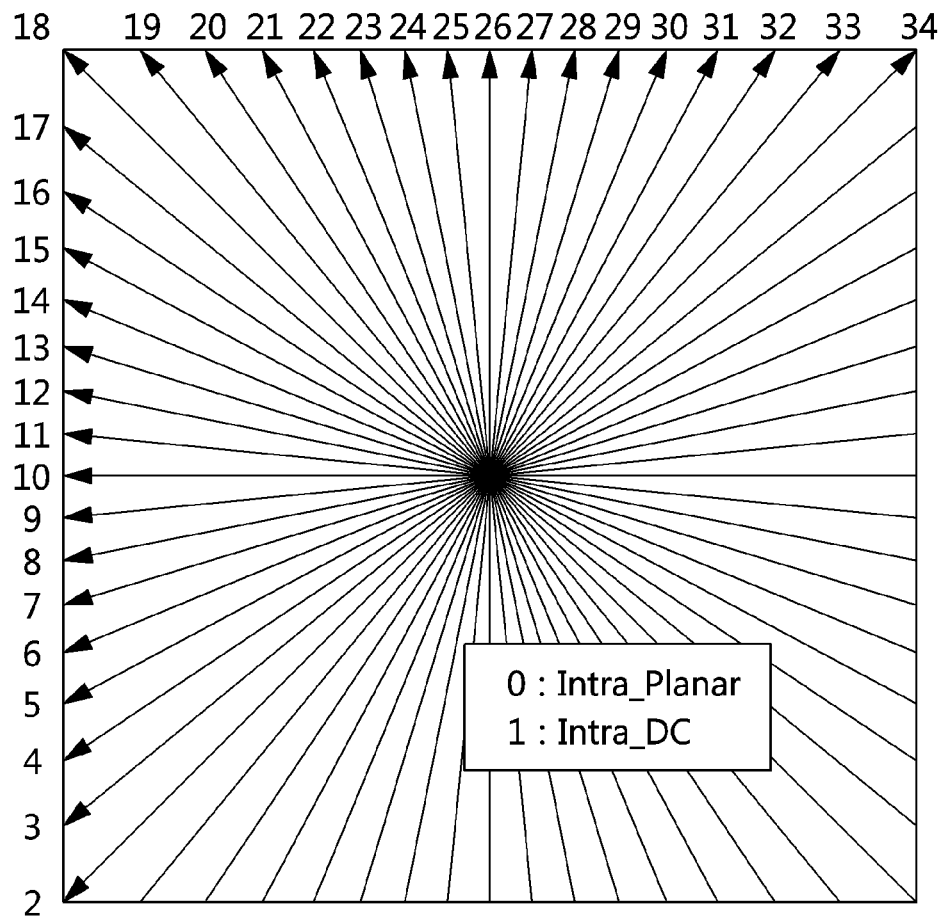
FIG. 6 is a diagram for explaining an embodiment of an intra-prediction procedure.

FIG. 6 is a diagram for explaining an embodiment of an intra-prediction process.

Arrows radially extending from the center of the graph in FIG. 6 indicate the prediction directions of intra-prediction modes. Further, numbers appearing near the arrows indicate examples of mode values assigned to intra-prediction modes or to the prediction directions of the intra-prediction modes.

Intra encoding and/or decoding may be performed using reference samples of blocks neighboring a target block. The neighboring blocks may be neighboring reconstructed blocks. For example, intra encoding and/or decoding may be performed using the values of reference samples which are included in each neighboring reconstructed block or the coding parameters of the neighboring reconstructed block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may a rectangular block having a size of M×N, such as 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc.

For example, the number of intra-prediction modes may be fixed at 35 regardless of the size of a prediction block. Alternatively, the number of intra-prediction modes may be, for example, 3, 5, 9, 17, 34, 35, or 36.

The intra-prediction modes may be non-directional modes or directional modes. For example, the intra-prediction modes may include two non-directional modes and 33 directional modes, as shown in FIG. 6.

The directional mode may include a DC mode and a planar mode. For example, a value of the DC mode may be 1. A value of the planar mode may be 0.

The directional modes may be prediction modes having a specific direction or a specific angle. Among the plurality of the intra prediction modes, remaining modes except for the DC mode and the planar mode may be directional modes.

The intra-prediction modes may each be represented by at least one of a mode number, a mode value, a mode number, and a mode angle. The number of intra-prediction modes may be M. The value of M may be 1 or more. In other words, the number of intra-prediction modes may be M, which includes the number of non-directional modes and the number of directional modes.

The number of intra-prediction modes may be fixed to M regardless of the size of a block. Alternatively, the number of intra-prediction modes may differ depending on the size of a block and/or the type of color component. For example, the number of prediction modes may differ depending on whether a color component is a luma signal or a chroma signal. For example, the larger the size of the block, the greater the number of intra-prediction modes. Alternatively, the number of intra-prediction modes corresponding to a luma component block may be greater than the number of intra-prediction modes corresponding to a chroma component block.

For example, in a vertical mode having a mode value of 26, prediction may be performed in a vertical direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 6, the intra-prediction modes in which a mode value is one of 27, 28, 29, 30, 31, 32, 33, and 34 may be vertical-right modes 613. Intra-prediction modes in which a mode value is one of 2, 3, 4, 5, 6, 7, 8, and 9 may be horizontal-below modes 616.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighboring block can be used as reference samples of a target block may be performed. When a sample that cannot be used as a reference sample of the current block is present among samples in the neighboring block, a value generated via copying and/or interpolation that uses at least one sample value, among the samples included in the reconstructed neighboring block, may replace the sample value of the sample that cannot be used as the reference sample. When the value generated via copying and/or interpolation replaces the sample value of the existing sample, the sample may be used as the reference sample of the target block.

In intra prediction, a filter may be applied to at least one of a reference sample and a prediction sample based on at least one of the intra-prediction mode and the size of the target block.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may perform prediction from intra prediction of a neighboring block adjacent to the target block, and the information used for prediction may be entropy-encoded/decoded.

For example, when the intra-prediction modes of the target block and the neighboring block are identical to each other, it may be signaled, using a predefined flag, that the intra-prediction modes of the target block and the neighboring block are identical.

For example, an indicator for indicating an intra-prediction mode identical to that of the target block, among intra-prediction modes of multiple neighboring blocks, may be signaled.

When the intra-prediction modes of the target block and the neighboring block are different from each other, the intra-prediction mode information of the target block may be entropy-encoded/decoded based on the intra-prediction mode of the neighboring block.

Figure 7:
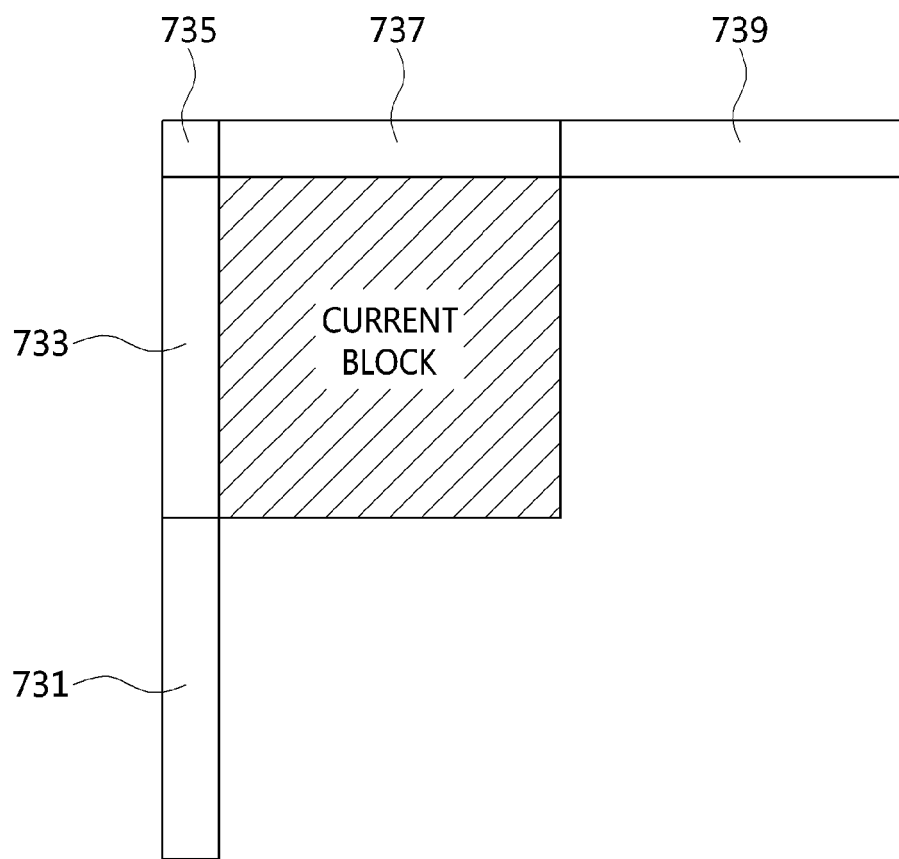
FIG. 7 is a diagram for explaining the locations of reference samples used in an intra-prediction procedure.

FIG. 7 is a diagram for explaining the locations of reference samples used in an intra-prediction procedure.

FIG. 7 illustrates the locations of reference samples used for intra prediction of a target block. Referring to FIG. 7, reconstructed reference samples used for intra prediction of the target block may include below-left reference samples 731, left reference samples 733, an above-left corner reference sample 735, above reference samples 737, and above-right reference samples 739.

For example, the left reference samples 733 may mean reconstructed reference pixels adjacent to the left side of the target block. The above reference samples 737 may mean reconstructed reference pixels adjacent to the top of the target block. The above-left corner reference sample 735 may mean a reconstructed reference pixel located at the above-left corner of the target block. The below-left reference samples 731 may mean reference samples located below a left sample line composed of the left reference samples 733, among samples located on the same line as the left sample line. The above-right reference samples 739 may mean reference samples located to the right of an above sample line composed of the above reference samples 737, among samples located on the same line as the above sample line.

When the size of a target block is N×N, the numbers of the below-left reference samples 731, the left reference samples 733, the above reference samples 737, and the above-right reference samples 739 may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode having a mode value of 26, the above reference samples 737 may be used for intra prediction. When the intra-prediction mode is the vertical mode, the value of a pixel in the prediction block may be the value of a reference sample vertically located above the location of the pixel. Therefore, the above reference samples 737 adjacent to the top of the target block may be used for intra prediction. Furthermore, the values of pixels in one row of the prediction block may be identical to those of the above reference samples 737.

In an example, when the mode value of the intra-prediction mode of the current block is 18, at least some of the left reference samples 733, the above-left corner reference sample 735, and at least some of the above reference samples 737 may be used for intra prediction. When the mode value of the intra-prediction mode is 18, the value of a pixel in the prediction block may be the value of a reference sample diagonally located at the above-left corner of the pixel.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighboring blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

Figure 8:
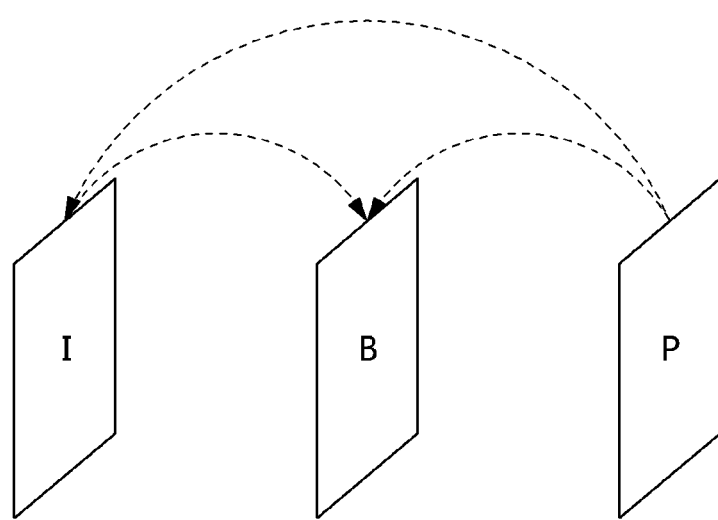
FIG. 8 is a diagram for explaining an embodiment of an inter-prediction procedure.

FIG. 8 is a diagram for explaining an embodiment of an inter prediction procedure.

The rectangles shown in FIG. 8 may represent images (or pictures). Further, in FIG. 8, arrows may represent prediction directions. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter prediction may be performed using motion information.

In an inter mode, the encoding apparatus 100 may perform inter prediction and/or motion compensation on a target block. The decoding apparatus 200 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighboring block, motion information of a co-located (col block), and/or motion information of a block adjacent to the col block. The col block may be a block in a previously reconstructed co-located picture (col picture). The location of the col block in the col-picture may correspond to the location of the target block in a target image. The col picture may be any one of one or more reference pictures included in a reference picture list.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighboring block that is horizontally adjacent to the target block, or a block horizontally adjacent to a neighboring block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first distance to a second distance. The first distance may be the distance between the reference picture and the target picture of the target block. The second distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighboring region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Spatial motion candidates may include a reconstructed spatial neighboring block. In other words, the motion vector of the reconstructed neighboring block may be referred to as a "spatial prediction motion vector candidate".

Temporal motion candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

An MVD may be the difference between the motion vector of the target block and the prediction motion vector. The encoding apparatus 100 may calculate an MVD and may entropy-encode the MVD.

The MVD may be transmitted from the encoding apparatus 100 to the decoding apparatus 200 through a bitstream. The decoding apparatus 200 may decode the received MVD. The decoding apparatus 200 may derive the motion vector of the target block by summing the decoded MVD and the prediction motion vector. In other words, the motion vector of the target block derived by the decoding apparatus 200 may be the sum of the entropy-decoded MVD and the motion vector candidate.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture to be used for prediction of a target block, among reference pictures in the reference picture list. The reference picture index may be entropy-encoded by the encoding apparatus 100. The entropy-encoded reference picture index may be signaled to the decoding apparatus 200 by the encoding apparatus 100 through a bitstream.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighboring blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighboring blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighboring units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighboring block.

When a merge mode is used, the encoding apparatus 100 may predict the motion information of a target block using the motion information of a spatial candidate and/or the motion information of a temporal candidate. The spatial candidate may include a reconstructed spatial neighboring block that is spatially adjacent to the target block. The spatially adjacent block may include a left adjacent block and an above adjacent block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. Further, the merge candidate list may include new merge candidates generated by a combination of merge candidates that are already present in the merge candidate list. In other words, the merge candidate list may include new motion information generated by a combination of pieces of motion information previously present in the merge candidate list.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100.

The decoding apparatus 200 may perform inter prediction on the target block using the inter-prediction information of the bitstream.

The inter-prediction information may contain 1) mode information indicating whether a merge mode is used and 2) a merge index.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighboring blocks spatially or temporally adjacent to the target block.

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVC, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a current picture to which a target block belongs.

A vector for specifying the previously reconstructed region may be defined. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the current picture may be added to a fixed location or an arbitrary location in a reference picture list for the target block.

For example, the fixed location may be either a location where the reference picture index is 0 or the last location.

When the current picture is added to an arbitrary location in the reference picture list, an additional reference picture index indicating such an arbitrary location may be signaled by the encoding apparatus 100 to the decoding apparatus 200.

In the above-described AMVP mode, merge mode, and skip mode, motion information to be used for the prediction of a target block may be specified, among pieces of motion information in the list, using the index of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 9:
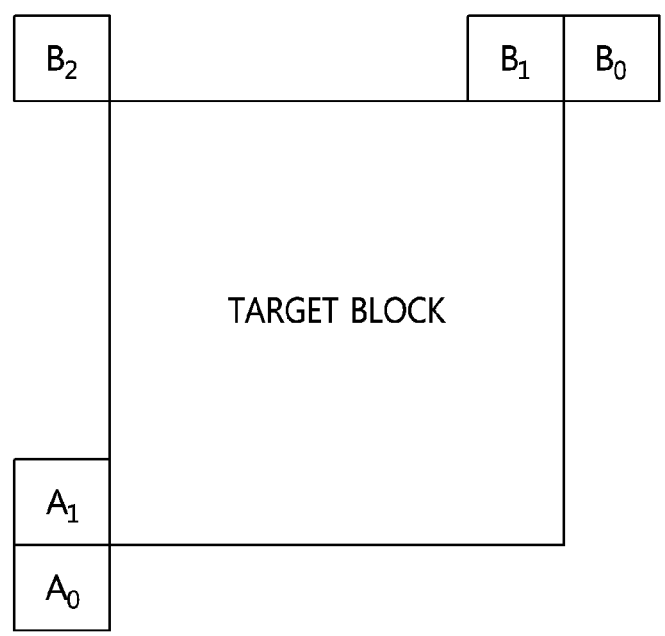
FIG. 9 illustrates spatial candidates according to an embodiment.

FIG. 9 illustrates spatial candidates according to an embodiment.

In FIG. 9, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH+1).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH).

Spatial candidate $B_0$ may be a block adjacent to the above-right corner of the target block. $B_0$ may be a block that occupies pixels located at coordinates (xP+nPSW+1, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 10:
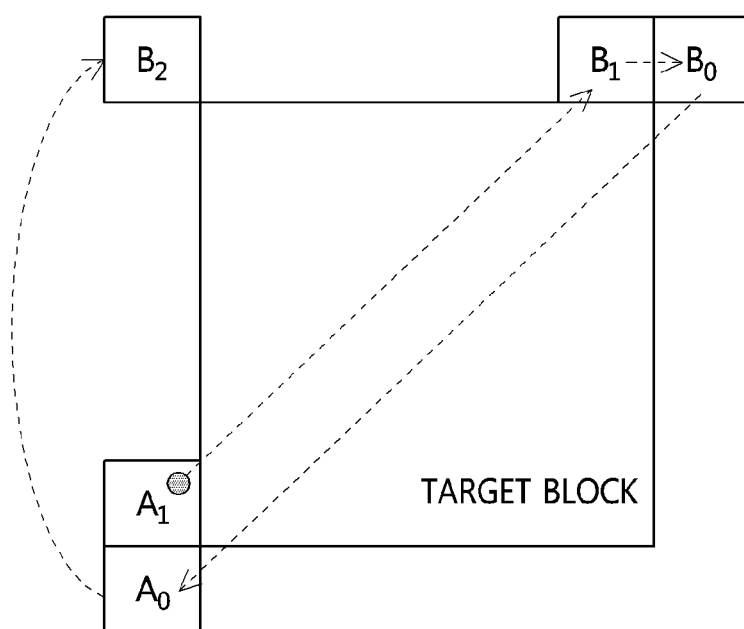
FIG. 10 illustrates the order of addition of motion information of spatial candidates to a merge list according to an embodiment.

FIG. 10 illustrates the order of addition of motion information of spatial candidates to a merge list according to an embodiment.

As shown in FIG. 10, when pieces of motion information of spatial candidates are added to a merge list, the order of $A_1, B_1, B_0, A_0,$ and $B_2$ may be used. That is, pieces of motion information of available spatial candidates may be added to the merge list in the order of $A_1, B_1, B_0, A_0,$ and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 11:
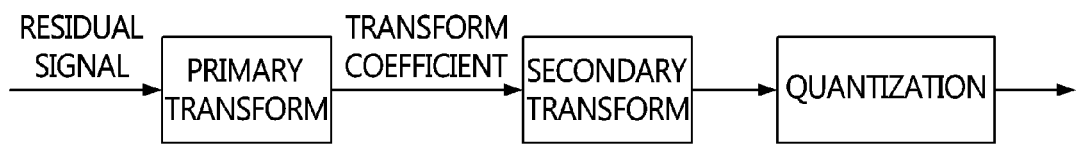
FIG. 11 illustrates a transform and quantization process according to an example.

FIG. 11 illustrates a transform and quantization process according to an example.

As illustrated in FIG. 11, quantized levels may be generated by performing a transform and/or quantization process on a residual signal.

A residual signal may be generated as the difference between an original block and a prediction block. Here, the prediction block may be a block generated via intra prediction or inter prediction.

The transform may include at least one of a primary transform and a secondary transform. A transform coefficient may be generated by performing the primary transform on the residual signal, and a secondary transform coefficient may be generated by performing the secondary transform on the transform coefficient.

The primary transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

The secondary transform may be performed on the transform coefficient generated by performing the primary transform.

Transform methods applied to the primary transform and/or the secondary transform may be determined based on at least one of coding parameters for a target block and/or a neighboring block. Alternatively, transform information indicating transform methods may be signaled by the encoding apparatus to the decoding apparatus 200.

The quantized levels may be generated by performing quantization on the result, generated by performing the primary transform and/or the secondary transform, or on the residual signal.

The quantized levels may be scanned based on at least one of up-right diagonal scanning, vertical scanning, and horizontal scanning, depending on at least one of an intra-prediction mode, a block size, and a block form.

For example, coefficients may be changed to 1D vector forms by scanning coefficients of blocks using up-right diagonal scanning. Alternatively, depending on the size of a transform block and/or an intra-prediction mode, vertical scanning, which scans 2D block-format coefficients in a column direction, or horizontal scanning, which scans 2D block-format coefficients in a row direction, may be used instead of the up-right diagonal scanning.

The scanned quantized levels may be entropy-encoded, and a bitstream may include the entropy-encoded quantized levels.

The decoding apparatus 200 may generate quantized levels via entropy decoding on the bitstream. The quantized levels may be aligned in the form of a 2D block via inverse scanning Here, as the method of inverse scanning, at least one of up-right diagonal scanning, vertical scanning, and horizontal scanning may be performed.

Dequantization may be performed on the quantized levels. A secondary inverse transform may be performed on the result generated by performing dequantization depending on whether to perform the secondary inverse transform. Further, a primary inverse transform may be performed on the result generated by performing the secondary inverse transform depending on whether the primary inverse transform is to be performed. A reconstructed residual signal may be generated by performing the primary inverse transform on the result generated by performing the secondary inverse transform.

Figure 12:
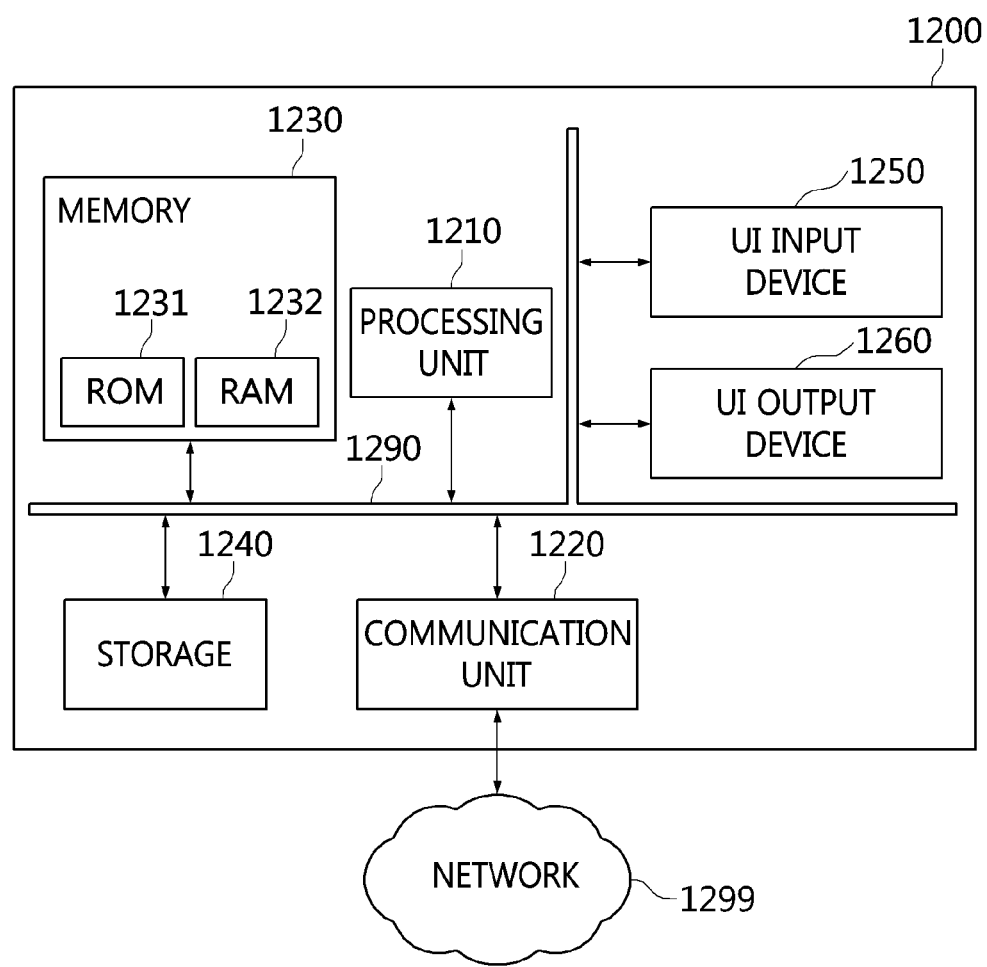
FIG. 12 is a configuration diagram of an encoding apparatus according to an embodiment.

FIG. 12 is a configuration diagram of an encoding apparatus according to an embodiment.

An encoding apparatus 1200 may correspond to the above-described encoding apparatus 100.

The encoding apparatus 1200 may include a processing unit 1210, memory 1230, a user interface (UI) input device 1250, a UI output device 1260, and storage 1240, which communicate with each other through a bus 1290. The encoding apparatus 1200 may further include a communication unit 1220 coupled to a network 1299.

The processing unit 1210 may be a Central Processing Unit (CPU) or a semiconductor device for executing processing instructions stored in the memory 1230 or the storage 1240. The processing unit 1210 may be at least one hardware processor.

The processing unit 1210 may generate and process signals, data or information that are input to the encoding apparatus 1200, are output from the encoding apparatus 1200, or are used in the encoding apparatus 1200, and may perform examination, comparison, determination, etc. related to the signals, data or information. In other words, in embodiments, the generation and processing of data or information and examination, comparison and determination related to data or information may be performed by the processing unit 1210.

The processing unit 1210 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190 may be program modules, and may communicate with an external device or system. The program modules may be included in the encoding apparatus 1200 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1200.

The processing unit 1210 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 190.

A storage unit may denote the memory 1230 and/or the storage 1240. Each of the memory 1230 and the storage 1240 may be any of various types of volatile or nonvolatile storage media. For example, the memory 1230 may include at least one of Read-Only Memory (ROM) 1231 and Random Access Memory (RAM) 1232.

The storage unit may store data or information used for the operation of the encoding apparatus 1200. In an embodiment, the data or information of the encoding apparatus 1200 may be stored in the storage unit.

For example, the storage unit may store pictures, blocks, lists, motion information, inter-prediction information, bitstreams, etc.

The encoding apparatus 1200 may be implemented in a computer system including a computer-readable storage medium.

The storage medium may store at least one module required for the operation of the encoding apparatus 1200. The memory 1230 may store at least one module, and may be configured such that the at least one module is executed by the processing unit 1210.

Functions related to communication of the data or information of the encoding apparatus 1200 may be performed through the communication unit 1220.

For example, the communication unit 1220 may transmit a bitstream to a decoding apparatus 1300, which will be described later.

Figure 13:
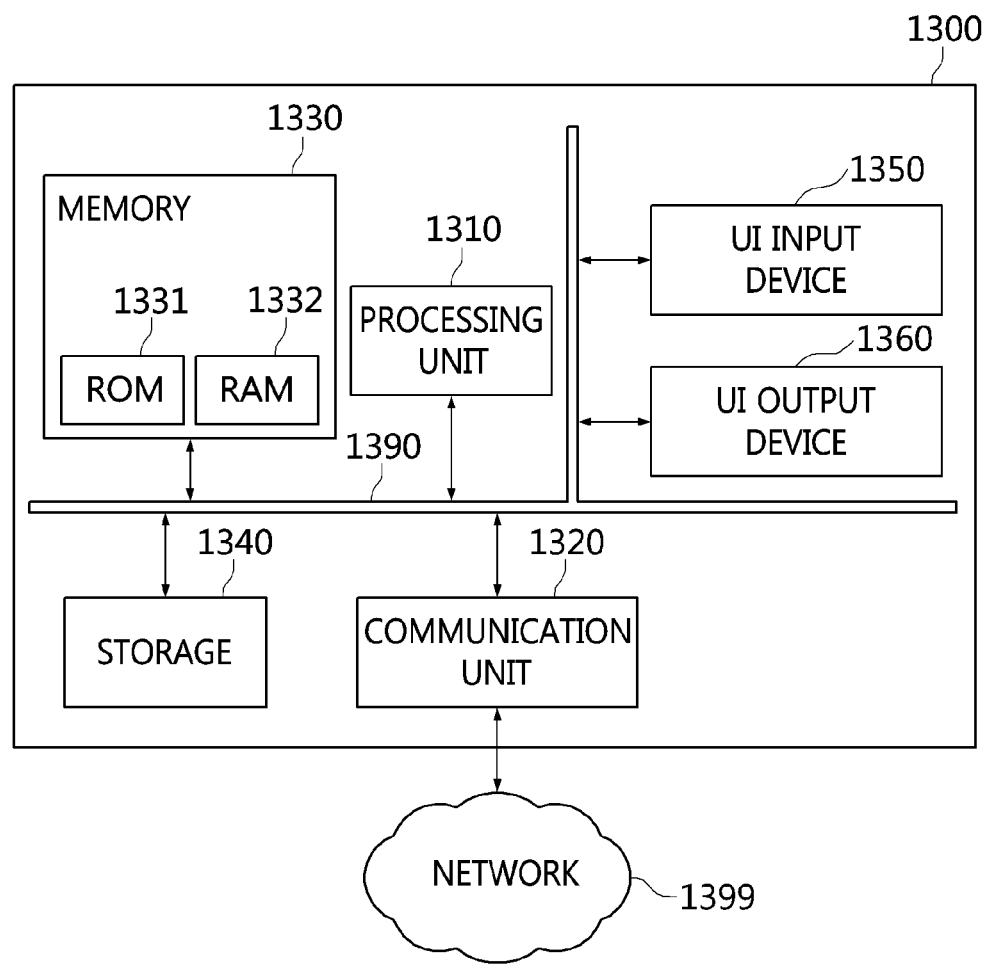
FIG. 13 is a configuration diagram of a decoding apparatus according to an embodiment.

FIG. 13 is a configuration diagram of a decoding apparatus according to an embodiment.

The decoding apparatus 1300 may correspond to the above-described decoding apparatus 200.

The decoding apparatus 1300 may include a processing unit 1310, memory 1330, a user interface (UI) input device 1350, a UI output device 1360, and storage 1340, which communicate with each other through a bus 1390. The decoding apparatus 1300 may further include a communication unit 1320 coupled to a network 1399.

The processing unit 1310 may be a Central Processing Unit (CPU) or a semiconductor device for executing processing instructions stored in the memory 1330 or the storage 1340. The processing unit 1310 may be at least one hardware processor.

The processing unit 1310 may generate and process signals, data or information that are input to the decoding apparatus 1300, are output from the decoding apparatus 1300, or are used in the decoding apparatus 1300, and may perform examination, comparison, determination, etc. related to the signals, data or information. In other words, in embodiments, the generation and processing of data or information and examination, comparison and determination related to data or information may be performed by the processing unit 1310.

The processing unit 1310 may include an entropy decoding unit 210, a dequantization unit 220, an inverse transform unit 230, an intra-prediction unit 240, an inter-prediction unit 250, an adder 255, a filter unit 260, and a reference picture buffer 270.

At least some of the entropy decoding unit 210, the dequantization unit 220, the inverse transform unit 230, the intra-prediction unit 240, the inter-prediction unit 250, the adder 255, the filter unit 260, and the reference picture buffer 270 of the decoding apparatus 200 may be program modules, and may communicate with an external device or system. The program modules may be included in the decoding apparatus 1300 in the form of an operating system, an application program module, or other program modules.

The program modules may be physically stored in various types of well-known storage devices. Further, at least some of the program modules may also be stored in a remote storage device that is capable of communicating with the decoding apparatus 1300.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1300.

The processing unit 1310 may execute instructions or code in the entropy decoding unit 210, the dequantization unit 220, the inverse transform unit 230, the intra-prediction unit 240, the inter-prediction unit 250, the adder 255, the filter unit 260, and the reference picture buffer 270.

A storage unit may denote the memory 1330 and/or the storage 1340. Each of the memory 1330 and the storage 1340 may be any of various types of volatile or nonvolatile storage media. For example, the memory 1330 may include at least one of ROM 1331 and RAM 1332.

The storage unit may store data or information used for the operation of the decoding apparatus 1300. In an embodiment, the data or information of the decoding apparatus 1300 may be stored in the storage unit.

For example, the storage unit may store pictures, blocks, lists, motion information, inter-prediction information, bitstreams, etc.

The decoding apparatus 1300 may be implemented in a computer system including a computer-readable storage medium.

The storage medium may store at least one module required for the operation of the decoding apparatus 1300. The memory 1330 may store at least one module, and may be configured such that the at least one module is executed by the processing unit 1310.

Functions related to communication of the data or information of the decoding apparatus 1300 may be performed through the communication unit 1320.

For example, the communication unit 1320 may receive a bitstream from the encoding apparatus 1200.

Figure 14:
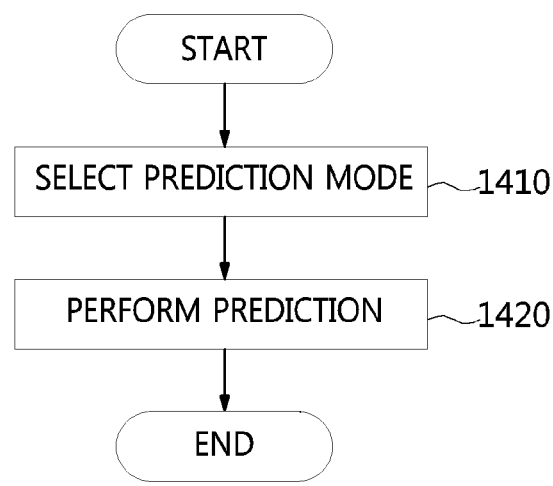
FIG. 14 is a flowchart of a prediction method according to an embodiment.

FIG. 14 is a flowchart of a prediction method according to an embodiment.

The prediction method may be performed by an encoding apparatus 1200 and/or a decoding apparatus 1300.

For example, the encoding apparatus 1200 may perform the prediction method according to the present embodiment in order to compare the efficiencies of multiple prediction schemes for a target block and/or multiple partition blocks, and may also perform the prediction method according to the present embodiment in order to generate a reconstructed block of the target block.

For example, the decoding apparatus 1300 may perform the prediction method according to the embodiment in order to generate a reconstructed block of the target block.

Hereinafter, a processing unit may correspond to the processing unit 1210 of the encoding apparatus 1200 and/or the processing unit 1310 of the decoding apparatus 1300.

At step 1410, the processing unit may select a prediction mode to be used for prediction of the target block. The selected prediction mode may include one or more prediction modes.

In an embodiment, when there are multiple selected prediction modes, prediction mode decision information for deciding on the prediction mode to be used for the prediction of the target block, among the multiple selected prediction modes, may be used. In the encoding of the target block, when there are multiple selected prediction modes, the processing unit may generate prediction mode decision information that indicates the prediction mode to be used for the prediction of the target block, among the multiple selected prediction modes.

In an embodiment, the selected prediction mode may be an inter-prediction mode. The prediction mode may be a specified inter-prediction method, among multiple inter-prediction methods.

In an embodiment, the selected prediction mode may be an intra-prediction mode. The prediction mode may be a specified intra-prediction method, among multiple intra-prediction methods.

An example of step 1410 will be described in detail later with reference to FIG. 15.

At step 1420, the processing unit may perform prediction of the target block based on the selected prediction mode.

In an embodiment, prediction may be intra prediction or inter prediction.

In the decoding of the target block, when there are multiple selected prediction modes, the processing unit may decide on the prediction mode to be used for the prediction of the target block, among the multiple selected prediction modes, using the prediction mode decision information.

An example of step 1420 will be described in detail later with reference to FIGS. 20 and 21.

Figure 15:
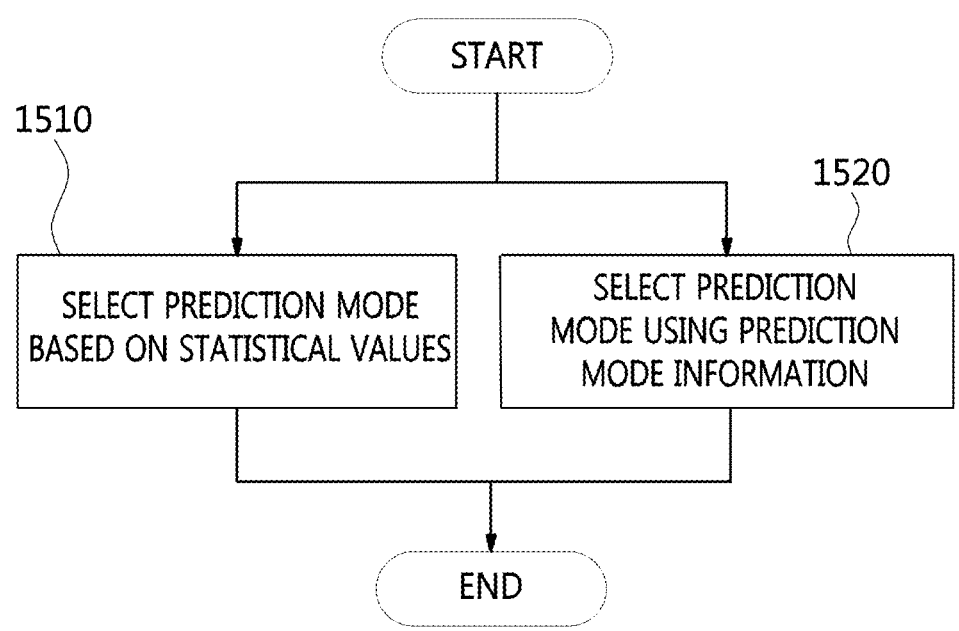
FIG. 15 is a flowchart of a prediction mode selection method according to an embodiment.

FIG. 15 is a flowchart of a prediction mode selection method according to an embodiment.

The prediction mode selection method according to the embodiment may correspond to the above-described step 1410. Step 1410 may include steps 1510 and 1520.

At step 1410, the processing unit may select one or more prediction modes from among multiple prediction modes when performing inter prediction on a target block.

The multiple prediction modes may also be referred to as "multiple available prediction modes" that can be used in the encoding apparatus 1200 and/or the decoding apparatus 1300. The one or more selected prediction modes may also be referred to as "one or more prediction mode candidates". The one or more selected prediction modes may be one or more prediction mode candidates that can be used for the encoding and/or decoding of the target block.

In an embodiment, the multiple prediction modes may include at least one of an Advanced Motion Vector Prediction (AMVP) mode, a merge mode, a skip mode, an Advanced Temporal Motion Vector Prediction (ATMVP) mode, a Spatial-Temporal Motion Vector Predictor (STMVP) mode, a Pattern-Matched Motion Vector Derivation (PMMVD) template matching mode, a bilateral matching mode, an affine mode, a bi-directional Optical flow (BIO) mode, a Decoder-side Motion Vector Refinement (DMVR) mode, and a Local Illumination Compensation (LIC) mode.

In an embodiment, the affine mode may include an affine inter mode and an affine merge mode.

In an embodiment, a merge or AMVP candidate list may be configured based on motion information of a first prediction mode. For example, a candidate having a motion vector similar to or identical to the motion vector of the first prediction mode may be excluded from the merge or AMVP candidate list, or alternatively, the order of candidates may be changed. The first prediction mode may be at least one of the AMVP mode, the merge mode, the skip mode, the template matching mode, the bilateral matching mode, and the affine merge mode.

In an embodiment, the multiple prediction modes may include the above-described additional modes.

The processing unit may select one or more prediction modes from among the multiple prediction modes using at least one of the prediction mode selection method at step 1510 and the prediction mode selection method at step 1520.

At step 1510, the processing unit may select the prediction modes based on the statistical values of multiple prediction modes.

For example, the prediction mode having the lowest statistical value or the highest statistical value may be selected by comparing the statistical values of the multiple prediction modes.

The statistical value may mean at least one of an average value, a maximum value, a minimum value, a mode, a median value, a weighted-average value, a distortion value, and a rate-distortion value.

Alternatively, the above-described statistical value may be a rate-distortion cost or the statistical value of the rate-distortion cost. The processing unit may calculate, for respective multiple prediction modes, the rate-distortion costs of the multiple prediction modes by performing entropy encoding on the target block that uses the respective prediction modes. The processing unit may select one or more prediction modes from among the multiple prediction modes depending on the rate-distortion costs. The processing unit may select the prediction mode having the lowest rate-distortion cost by comparing the rate-distortion costs of the multiple prediction modes.

At step 1520, the processing unit may derive prediction mode information for the target block, and may select one or more prediction modes from among the multiple prediction modes using the derived prediction mode information.

In an embodiment, the processing unit may use information related to a reference block when deriving the prediction mode information. Alternatively, the prediction mode information may include information related to a reference block.

In an embodiment, the reference block may include one or more of a spatially neighboring block that is spatially adjacent to the target block and a temporally neighboring block that is temporally adjacent to the target block.

For example, the processing unit may use one or more of derivation of prediction mode information that uses a spatially neighboring block and derivation of prediction mode information that uses a temporally neighboring block when deriving the prediction mode information for the target block using the information related to the reference block.

In an embodiment, the information related to the reference block may include one or more of the motion vector of the reference block, the prediction direction of the reference block, a reference picture index for the reference block, the encoding mode of the reference block, a reference picture list for the reference block, the Picture Order Count (POC) of the reference block, the Quantization Parameter (QP) of the reference block, and the Coded Block Flag (CBF) of the reference block.

In an embodiment, the information related to the reference block may further include the above-described information to be used for the encoding and/or decoding of the reference block.

In an embodiment, the processing unit may select a prediction mode from among the template matching mode and the bilateral matching mode. The multiple prediction modes may include the template matching mode and the bilateral matching mode.

When selecting one or more prediction modes from among the multiple prediction modes, namely the template matching mode and the bilateral matching mode, the processing unit may derive the motion vectors of reference blocks, may determine consistency between the derived motion vectors, and may select one or more prediction modes from among the multiple prediction modes based on the determined consistency. The derivation of motion vectors, the determination of consistency, and the selection of prediction modes will be described later with reference to FIG. 16.

In an embodiment, the processing unit may select one or more prediction modes from among the multiple prediction modes using a prediction direction. The prediction direction may be the prediction direction of the target block or the prediction direction of a reference block.

In an embodiment, the processing unit may select one or more prediction modes depending on which one of unidirectional prediction and bidirectional prediction is inter prediction of the target block.

For example, the processing unit may select a bilateral matching mode from among the multiple prediction modes when the inter prediction of the target block is bidirectional prediction. The processing unit may select a template matching mode from among the multiple prediction modes when the inter prediction of the target block is unidirectional prediction.

For example, the processing unit may select the bilateral matching mode from among the multiple prediction modes when the inter prediction of a reference block is bidirectional prediction. The processing unit may select the template matching mode from among the multiple prediction modes when the inter prediction of the reference block is unidirectional prediction.

In an embodiment, the processing unit may select one or more prediction modes from among the multiple prediction modes using a coding parameter. The coding parameter may be the coding parameter of the target block or the coding parameter of the reference block.

For example, the processing unit may determine whether the prediction mode of the reference block is an intra-prediction mode or an inter-prediction mode depending on the coding parameter of the reference block. The processing unit may select one or more prediction modes from among the multiple prediction modes depending on which one of the intra-prediction mode and the inter-prediction mode is the prediction mode of the reference block. The reference block may be a temporally neighboring block.

In an embodiment, the processing unit may select one or more prediction modes from among the multiple prediction modes using a Picture Order Count (POC). The POC may be the POC of a target picture including the target block or the POC of a reference picture including a reference block.

For example, the processing unit may select one or more prediction modes from among the multiple prediction modes based on the difference between specific POCs.

For example, the processing unit may select the template matching mode from among the multiple prediction modes when the difference between the specific POCs is less than a threshold. Here, the specific POCs may be the POC of the target picture and the POC of the reference picture.

Figure 16:
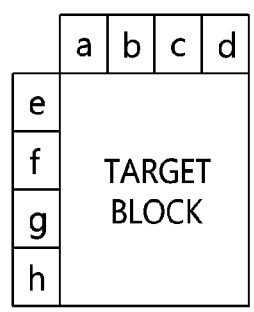
FIG. 16 illustrates reference blocks according to an example.

FIG. 16 illustrates reference blocks according to an example.

As described above, when one or more prediction modes for a target block are selected from among multiple prediction modes, motion vectors of the reference blocks may be used. The motion vectors may be derived as follows.

The reference blocks may include blocks spatially adjacent to the target block.

In FIG. 16, "a" denotes block a. Block a may be the leftmost block, among blocks adjacent to the top of the target block. "b" denotes block b. Block b may be the second block from the left, among the blocks adjacent to the top of the target block. "c" denotes block c. Block b may be the second block from the right, among the blocks adjacent to the top of the target block. "d" denotes block d. Block d may be the rightmost block, among the blocks adjacent to the top of the target block.

In FIG. 16, "e" denotes block e. Block e may be the uppermost block, among blocks adjacent to the left of the target block. "f" denotes block f. Block f may be the second block from the top, among the blocks adjacent to the left of the target block. "g" denotes block g. Block g may be the second block from the bottom, among the blocks adjacent to the left of the target block. "h" denotes block h. Block h may be the lowermost block, among the blocks adjacent to the left of the target block.

The processing unit may exploit the motion vectors of n or more merge candidates when deriving the motion vectors of the reference blocks. In other words, the reference blocks may be n or more merge candidates. Here, n may be a positive integer.

For example, when the processing unit derives two motion vectors, it may use a first merge candidate and a second merge candidate as reference blocks.

For example, when the processing unit derives three motion vectors, it may use a first merge candidate, a second merge candidate, and a third merge candidate as reference blocks.

In an embodiment, the merge candidates may be blocks present at specific locations with respect to the target block.

In an embodiment, the merge candidates may be blocks generated based on the blocks present at specific locations with respect to the target block. Alternatively, the merge candidates may be virtual blocks or derived blocks that are set based on the blocks present at the specific locations with respect to the target block. Alternatively, the virtual blocks or derived blocks may be regarded as the reference blocks. In this case, the reference blocks may be blocks generated based on the blocks present at specific locations with respect to the target block.

The blocks present at the specific locations may include spatially adjacent blocks and temporally adjacent blocks.

For example, when two merge candidates are used, the multiple merge candidates may include an upper (above) block and a left block. The upper block may be either a block adjacent to the top of the target block or a block generated based on the blocks adjacent to the top of the target block. The left block may be either a block adjacent to the left of the target block or a block generated based on the blocks adjacent to the left of the target block.

In an embodiment, the processing unit may derive the motion vector of one of block a, block b, block c, and block d, and may exploit the derived motion vector as the motion vector of the upper block.

For example, the processing unit may use the motion vector of block a as the motion vector of the upper block.

For example, the processing unit may use the motion vector of block d as the motion vector of the upper block.

In an embodiment, the processing unit may derive the motion vector of one of block e, block f, block g, and block h, and may exploit the derived motion vector as the motion vector of the left block.

For example, the processing unit may use the motion vector of block e as the motion vector of the left block.

For example, the processing unit may use the motion vector of block h as the motion vector of the left block.

In an embodiment, the processing unit may derive the motion vectors of one or more of block a, block b, block c, and block d, and may exploit a combination of the derived motion vectors as the motion vector of the upper block.

For example, the combination of the derived motion vectors may be the average of the derived motion vectors or the weighted average of the derived motion vectors. Alternatively, the combination of the derived motion vectors may be the result of a formula which uses the derived motion vectors or a motion vector decision scheme.

For example, the processing unit may exploit the average or weighted average of the motion vector of block a and the motion vector of block b as the motion vector of the upper block.

For example, the processing unit may exploit the average or weighted average of the motion vectors of the m leftmost blocks or m rightmost blocks, among blocks adjacent to the top of the target block, as the motion vector of the upper block. Here, m may be an integer of 2 or more.

For example, the processing unit may exploit the average or weighted average of the motion vectors of the block a, block b, block c, and block d as the motion vector of the upper block.

For example, the processing unit may exploit the average or weighted average of the motion vectors of the blocks adjacent to the top of the target block as the motion vector of the upper block.

In an embodiment, the processing unit may derive the motion vectors of one or more of block e, block f, block g, and block h, and may exploit a combination of the derived motion vectors as the motion vector of the left block.

For example, the combination of the derived motion vectors may be the average of the derived motion vectors or the weighted average of the derived motion vectors. Alternatively, the combination of the derived motion vectors may be the result of a formula which uses the derived motion vectors or a motion vector decision scheme.

For example, the processing unit may exploit the average or weighted average of the motion vector of block e and the motion vector of block f as the motion vector of the left block.

For example, the processing unit may exploit the average or weighted average of the motion vectors of m uppermost blocks or m lowermost blocks, among blocks adjacent to the left of the target block, as the motion vector of the left block. Here, m may be an integer of 2 or more.

For example, the processing unit may exploit the average or weighted average of the motion vectors of block e, block f, block g, and block h as the motion vector of the left block.

For example, the processing unit may exploit the average or weighted average of the motion vectors of blocks adjacent to the left of the target block as the motion vector of the left block.

In an embodiment, the processing unit may scale motion vectors when deriving motion vectors to be used for the motion vector of the left block.

For example, the processing unit may scale the motion vector of an adjacent block when the POC of a reference picture for an adjacent block does not match ((POC of target picture for target block)−1) in reference picture list L0. Here, the processing unit may scale the motion vector of the adjacent block in conformity with ((POC of target picture)−1).

For example, the processing unit may scale the motion vector of an adjacent block when the POC of a reference picture for an adjacent block does not match ((POC of target picture for target block)+1) in reference picture list L1. Here, the processing unit may scale the motion vector of the adjacent block in conformity with ((POC of target picture)+1).

In the above embodiment, a description has been made on the assumption that one or more motion vectors of one or more adjacent blocks are used to derive the motion vectors of merge candidates. Further, it may be considered that one or more motion vectors of one or more adjacent blocks are used to select one or more prediction modes from among multiple prediction modes. In other words, the merge candidates may be virtual blocks or derived blocks for defining motion vectors that are used to select one or more prediction modes. Further, the motion vectors of merge candidates may be regarded as motion vectors that are calculated, set or derived based on one or more motion vectors of one or more adjacent blocks.

Referring back to FIG. 15, as described above, the processing unit may determine consistency between the derived motion vectors of reference blocks at step 1520.

In an embodiment, the number of reference blocks may be 3. The processing unit may calculate the consistency using the motion vectors of three reference blocks. In the calculation of consistency, the following Equation 2 may be used.

$$\text{consistency}=\text{abs}\{(MV_{1x}-MV_{0x})-(MV_{2y}-MV_{0y})\}+\text{abs}\{(MV_{1y}-MV_{0y})+(MV_{2x}-MV_{0x})\} \quad \text{[Equation 2]}$$

In "MVnm" in Equation, n may denote the index or number of a reference block. For example, MV0 may denote a first reference block. Here, m may denote an x-coordinate or a y-coordinate of the corresponding motion vector. For example, MVnx may denote the x-coordinate of the motion vector of a reference block having an index of n. MVny may denote the y-coordinate of the motion vector of the reference block having an index of n.

In Equation, "abs { }" may denote an absolute value.

For example, the three reference blocks may be the above-described first merge candidate, second merge candidate, and third merge candidate.

In an embodiment, the processing unit may calculate consistency using the motion vectors of two reference blocks. In the calculation of consistency, the following Equation 3 may be used.

$$\text{consistency}=\text{abs}\{(MV_{1x}-MV_{0x})\}+\text{abs}\{(MV_{1y}-MV_{0y})\} \quad \text{[Equation 3]}$$

In an embodiment, the processing unit may calculate consistency using motion vectors present in one reference block. In this case, the reference block may be a block decoded via bidirectional prediction, and consistency may be calculated using two motion vectors in the reference block. In the calculation of consistency, the following Equation 4 may be used.

$$\text{consistency}=\text{abs}\{MV0_x+MV1_x\}+\text{abs}\{MV0_y+MV1_y\} \quad \text{[Equation 4]}$$

In "MVNm" in Equation, N may denote the index or number of a reference picture list of the reference block. For example, MV0 may denote a 0-th reference picture list, and m may denote an x-coordinate or y-coordinate of the motion vector. For example, MVNx may denote the x-coordinate of a motion vector in an N-th reference picture list of the reference block.

In Equation, "abs{ }" may denote an absolute value.

For example, the reference block may be the above-described first merge candidate, second merge candidate, or third merge candidate.

The processing unit may select one of a template matching mode and a bilateral matching mode as the prediction mode of the target block based on the calculated consistency when selecting the prediction mode of the target block.

In an embodiment, the processing unit may select one of the template matching mode and the bilateral matching mode as the prediction mode of the target block based on a comparison between the calculated consistency and a threshold.

In an embodiment, when the calculated consistency is greater than the threshold, the processing unit may select the template matching mode as the prediction mode of the target block.

In an embodiment, when the calculated consistency is less than the threshold, the processing unit may select the template matching mode as the prediction mode of the target block.

In an embodiment, when the calculated consistency is greater than the threshold, the processing unit may add the template matching mode to one or more prediction modes selected for the target block.

In an embodiment, when the calculated consistency is less than the threshold, the processing unit may add the template matching mode to one or more prediction modes selected for the target block.

In an embodiment, when the calculated consistency is greater than the threshold, the processing unit may add the bilateral matching mode to one or more prediction modes selected for the target block.

In an embodiment, when the calculated consistency is less than the threshold, the processing unit may add the bilateral matching mode to one or more prediction modes selected for the target block.

In an embodiment, the processing unit may select both the template matching mode and the bilateral matching mode as one or more prediction modes of the target block, regardless of the calculated consistency.

In an embodiment, the threshold may be set by the user of the encoding apparatus 1200 and/or the decoding apparatus 130. Alternatively, the threshold may be set based on information related to the target block and/or information related to the reference blocks.

For one or more prediction modes selected from among the multiple prediction modes based on the prediction mode information or the like, one of the selected one or more prediction modes may be used for the encoding and/or decoding of the target block.

Prediction mode decision information may be used to indicate the prediction mode to be used for the encoding and/or decoding of the target block among the selected one or more prediction modes. In other words, the prediction mode decision information may indicate a prediction mode for the encoding and/or decoding of the target block. The processing unit may perform encoding and/or decoding on the target block using the prediction mode indicated by the prediction mode decision information.

In order to decide on the prediction mode for decoding the target block, prediction mode decision information for deciding on the prediction mode may be signaled from the encoding apparatus 1200 to the decoding apparatus 1300.

When one or more prediction modes are selected from among the multiple prediction modes based on the prediction mode information or the like, the prediction mode decision information may be at least partially omitted depending on the selected one or more prediction modes.

In other words, the prediction mode decision information may include one or more pieces of partial prediction mode decision information, and at least some of the one or more pieces of partial prediction mode decision information may be omitted when the prediction mode decision information is signaled, depending on the one or more prediction modes selected from among the multiple prediction modes.

That is, when exclusion of a specific prediction mode from the selection from among the multiple prediction modes can be determined based on the prediction mode information or the like, the prediction mode decision information may be signaled such that information about the excluded prediction mode is omitted. Alternatively, when selection of only a specific prediction mode from among the multiple prediction modes can be determined based on the prediction mode information or the like, the prediction mode decision information may be signaled such that information about the specific prediction mode is included.

The following FIGS. 17 to 19 illustrate embodiments of signaling of prediction mode decision information according to an example.

FIG. 17 illustrates signaling of prediction mode decision information when two prediction modes are selected according to an example.

In FIG. 17, "1" may denote a first predefined value (e.g. 1, logic 1, or true).

"0" may denote a second predefined value (e.g. 0, logic 0 or false).

"X" may mean that signaling is not performed.

The prediction mode decision information may include at least one of a merge identifier, a matching prediction identifier, a condition, and a matching mode identifier. For example, the above-described multiple pieces of partial prediction mode decision information may each be a merge identifier, a matching prediction identifier, a condition, and a matching mode identifier. Alternatively, the condition may be the coding parameter or prediction mode information of the target block rather than being included in the prediction mode decision information.

The merge identifier may indicate whether a merge mode is used. The merge mode may premise the selection of one or more prediction modes from among multiple prediction modes in the embodiments. That is, one or more prediction modes may be selectively selected from among the multiple prediction modes only when the merge mode is executed.

When the merge identifier has the first predefined value, merging of the target block may be performed. When the merging of the target block is performed because the merge identifier has the first predefined value, the prediction mode decision information may include at least one of the matching prediction identifier, the condition, and the matching mode identifier.

When the merge identifier has the second predefined value, merging of the target block may not be performed. When the merging of the target block is not performed because the merge identifier has the second predefined value, the matching prediction identifier, the condition, and the matching mode identifier may be excluded from the prediction mode decision information. That is, when merging of the target block is not performed, the prediction mode decision information may not include the matching prediction identifier, the condition, and the matching mode identifier.

The matching prediction identifier may indicate whether one or more prediction modes are selected from among the multiple prediction modes in accordance with an embodiment.

When the matching prediction identifier has the first predefined value, one or more prediction modes may be selected from among the multiple prediction modes using the prediction mode information or the like, as described above. When one or more prediction modes are selected from among the multiple prediction modes because the matching prediction identifier has the first predefined value, the prediction mode decision information may include at least one of the condition and the matching mode identifier.

When the matching prediction identifier has the second predefined value, one or more prediction modes may not be selected, and the processing unit may use a specific prediction mode to decode the target block. For example, the specific prediction mode may be a merge mode. When one or more prediction modes are not selected from among the multiple prediction modes because the matching prediction identifier has the second predefined value, the condition and the matching mode identifier may be excluded from the prediction mode decision information. That is, when one or more prediction modes are not selected from among the multiple prediction modes, the prediction mode decision information may not include the condition and the matching mode identifier.

The processing unit may select one or more prediction modes from among the multiple prediction modes using the condition. In other words, the number of the selected one or more prediction modes may be set by the condition. The number of the selected one or more prediction modes may be plural or only one depending on the condition.

When the selected one or more prediction modes include a plurality of prediction modes, the prediction mode to be used for encoding the target block may be decided on among the plurality of selected prediction modes.

When the plurality of prediction modes are selected, the matching mode identifier may be required in order to decide on the prediction mode to be used for the encoding and/or decoding of the target block, among the plurality of selected prediction modes.

The matching mode identifier may indicate the prediction mode to be used for the encoding and/or decoding of the target block, among the plurality of selected prediction modes. The value of the matching mode identifier may be the number or index of the prediction mode to be used for the encoding and/or decoding of the target block, among the plurality of selected prediction modes. For example, when the value of the matching mode identifier is L, the prediction mode to be used for the encoding and/or decoding of the target block may be an L-th prediction mode or an L+1-th prediction mode, among the plurality of selected prediction modes.

When the plurality of prediction modes are selected, the prediction mode decision information may include the matching mode identifier indicating the prediction mode to be used for the encoding and/or decoding of the target block, among the plurality of selected prediction modes.

When one prediction mode is selected or the number of selected prediction modes is one, the matching mode identifier may be excluded from the prediction mode decision information. That is, when only one prediction mode is selected and the prediction mode to be used for the encoding and/or decoding of the target block can be decided on without requiring the matching mode identifier, the prediction mode decision information may not include the matching mode identifier.

In an embodiment, the condition may indicate the slice of a target picture for the target block. For example, when the slice of the target picture is a B slice, selected one or more prediction modes may include a template matching mode and a bilateral matching mode.

For example, when the selected one or more prediction modes include the template matching mode and the bilateral matching mode, if the matching mode identifier has the first predefined value, the template matching mode may be the matching mode to be used for the encoding and/or decoding of the target block. Further, in this case, when the matching mode identifier has the second predefined value, the bilateral matching mode may be the matching mode to be used for the encoding and/or decoding of the target block.

FIG. 18 illustrates signaling of prediction mode decision information when one prediction mode is selected according to an example.

In FIG. 18, functions of a merge identifier and a matching prediction identifier may be identical and/or similar to those described above with reference to FIG. 17. Repetitive descriptions will be omitted here.

When the matching prediction identifier has a first predefined value, a prediction mode may be selected from among multiple prediction modes using prediction mode information or the like.

For example, the prediction mode selected using the prediction mode information or the like may be only a template matching mode. When the number of selected prediction modes is one, a matching mode identifier may not be required. That is, when the number of selected prediction modes is one, the matching mode identifier may be excluded from prediction mode decision information. Alternatively, when the number of selected prediction modes is one, the prediction mode decision information may not include the matching mode identifier.

FIG. 19 illustrates signaling of prediction mode decision information when one prediction mode is selected according to an example.

In FIG. 19, functions of a merge identifier and a matching prediction identifier may be identical and/or similar to those described above with reference to FIG. 17. Repetitive descriptions will be omitted here.

When the matching prediction identifier has a first predefined value, a prediction mode may be selected from among multiple prediction modes using prediction mode information or the like.

For example, the prediction mode selected using the prediction mode information or the like may be only a bilateral matching mode. When the number of selected prediction modes is one, a matching mode identifier may not be required. That is, when the number of selected prediction modes is one, the matching mode identifier may be excluded from prediction mode decision information. Alternatively, when the number of selected prediction modes is one, the prediction mode decision information may not include the matching mode identifier.

The processing unit may identify which information is or is not contained in the prediction mode decision information using the values of the above-described merge identifier, matching prediction identifier and/or the condition.

Also, the processing unit may decide on the prediction mode to be used for the encoding and/or decoding of the target block using the values of the above-described merge identifier, matching prediction identifier, condition, and/or matching mode identifier.

As described above, the bilateral matching mode and/or the template matching mode may be used for the encoding and/or decoding of the target block. In FIGS. 20 and 21, prediction using the bilateral matching mode and prediction using the template matching mode will be respectively described below.

Figure 20:
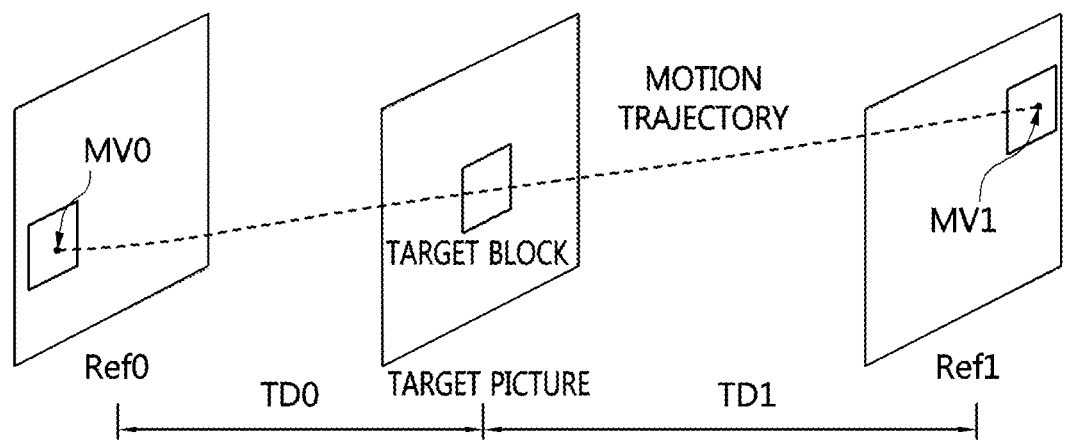
FIG. 20 illustrates prediction of a target block using a bilateral matching mode according to an example.

FIG. 20 illustrates prediction of a target block using a bilateral matching mode according to an example.

At step 1420, a processing unit may perform prediction on a target block using bilateral matching.

In an embodiment, the processing unit may determine whether to perform bilateral matching depending on the type of slice. The slice may be a slice of the target block.

For example, the processing unit may perform bilateral matching only when the slice is a B slice. Alternatively, the processing unit may perform bilateral matching only when the slice is a P slice or a B slice.

In an embodiment, when bilateral matching is performed, the processing unit may derive a motion vector MV0 using an initial motion vector that can be derived from the target block, and may derive a motion vector MV1 depending on the motion vector MV0.

The direction of the motion vector MV1 may be opposite that of the derived motion vector MV0, and the motion trajectory of the motion vector MV1 may be identical to that of the derived motion vector MV0. In other words, the motion vector MV1 may be a motion vector present on the same motion trajectory as the derived motion vector MV0 in the direction opposite that of the derived motion vector MV0.

The initial motion vector may be a motion vector that is initially derived.

"Ref0" may be reference picture 0 of MV0. "Ref1" may be reference picture 1 of MV1.

TD0 may be a trajectory distance between the target picture and reference picture 0. TD1 may be a trajectory distance between the target picture and reference picture 1.

In an embodiment, the number of initial motion vectors may be one or more.

In an embodiment, as illustrated in FIG. 20, the processing unit may derive an initial motion vector depending on the directionalities of one or more of the motion vectors MV0 and MV1.

For example, the processing unit may derive an initial motion vector for a target block from a reference picture list L0.

For example, the processing unit may derive an initial motion vector for the target block from a reference picture list L1.

When bilateral matching is performed, the processing unit may configure an initial motion vector candidate list, and may use at least one of one or more initial motion vector candidates, present in the configured initial motion vector candidate list, as the initial motion vector, when deriving the initial motion vector for the target block.

For example, the processing unit may use an AMVP mode to configure the initial motion vector candidate list for the target block. Prediction motion vector candidates present in a prediction motion vector candidate list in the AMVP mode may be one or more initial motion vector candidates present in the initial motion vector candidate list. The processing unit may add the prediction motion vector candidates present in the prediction motion vector candidate list in the AMVP mode to the initial motion vector candidate list.

For example, the processing unit may use a merge mode to configure the initial motion vector candidate list for the target block. Merge candidates present in a merge candidate list in the merge mode may be one or more initial motion vector candidates in the initial motion vector candidate list. The processing unit may add the merge candidates in the merge mode to the initial motion vector candidate list.

For example, the processing unit may configure matching-prediction unidirectional motion vectors for the target block in the form of the initial motion vector candidate list. The processing unit may add the matching-prediction unidirectional motion vectors for the target block to the initial motion vector candidate list.

For example, the processing unit may configure motion vectors for neighboring blocks of the target block in the form of the initial motion vector candidate list. The processing unit may add the motion vectors for the neighboring blocks of the target block to the initial motion vector candidate list.

For example, the processing unit may configure combinations of the above-described motion vectors in the form of the initial motion vector candidate list. The number of combinations of motion vectors may be N or more. N may be a positive integer. The processing unit may add the combinations of the above-described motion vectors to the initial motion vector candidate list.

For example, the processing unit may use motion vectors in one or more of the direction of a reference picture list L0 and the direction of a reference picture list L1 when configuring the initial motion vector candidate list. The processing unit may add motion vectors in one or more of the direction of the reference picture list L0 and the direction of the reference picture list L1 to the initial motion vector candidate list.

In an embodiment, when performing bilateral matching, the processing unit may derive the bidirectional motion vector that best matches an initial motion vector indication block and a block opposite thereto with each other using the initial motion vector candidate list. Here, the initial motion vector indication block may be the block indicated by the initial motion vector. The opposite block may be a block present on the same trajectory as the initial motion vector indication block in a direction opposite that of the initial motion vector indication block. In other words, the direction of the initial motion vector indication block and the direction of the opposite block may be opposite each other, and the trajectory of the initial motion vector indication block and the trajectory of the opposite block may be identical to each other.

For example, as illustrated in FIG. 20, when a motion vector present in the initial motion vector candidate list is MV0, the processing unit may derive a motion vector MV1 indicating a block 1) which is included in a reference picture in the direction opposite that of MV0, 2) which is present on the same trajectory as MV0, and 3) which best matches a block indicated by MV0.

In an embodiment, the processing unit may perform a refinement for the initial motion vector.

For example, the processing unit may search blocks neighboring the block indicated by MV0, and also search blocks neighboring the block indicated by the derived MV1. The processing unit may perform the refinement for the initial motion vector so that the best-matching blocks are indicated between the blocks neighboring the block indicated by MV0 and the blocks neighboring the block indicated by MV1.

In an embodiment, the processing unit may derive motion information on a sub-block basis when performing bilateral matching. The motion information may include motion vectors.

When motion information is derived on a sub-block basis, the processing unit may use the above-described scheme for deriving the initial motion vector on a block basis.

For example, a sub-block, which is the unit of derivation of motion information, may be a block having a size of 4×4. Alternatively, the sub-block may be a block having a size of 8×8. In other words, in the derivation of motion information, the reference block may be split into sub-blocks having a predefined size, such as a 4×4 size or 8×8 size.

In an embodiment, sub-blocks may be blocks corresponding to a combination of one or more predefined sizes. The sub-blocks may be blocks having sizes of one or more of 4×4 and 8×8. For example, sub-blocks may be 4×4 blocks and 8×8 blocks.

In an embodiment, the processing unit may define the degree of matching between blocks when performing bilateral matching. That is, the processing unit may use one of specific defined schemes in determining the degree of matching between blocks.

For example, the processing unit may determine that, when the Sum of Absolute Differences (SAD) between two blocks is the smallest, the two blocks best match each other. That is, the processing unit may determine that, as the SAD between two blocks is smaller, the two blocks better match each other.

For example, the processing unit may determine that, when the Sum of Absolute Transformed Differences (SATD) between two blocks is the smallest, the two blocks best match each other. That is, the processing unit may determine that, as the SATD between two blocks is smaller, the two blocks better match each other.

Figure 21:
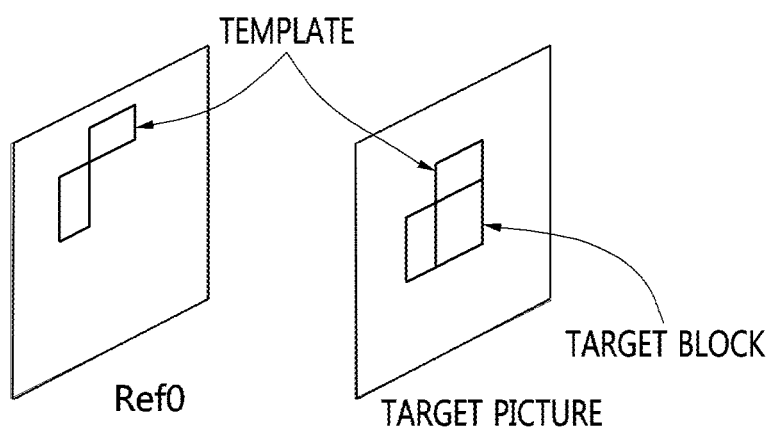
FIG. 21 illustrates prediction of a target block using a template matching mode according to an example.

FIG. 21 illustrates prediction of a target block using a template matching mode according to an example.

At step 1420, the processing unit may perform prediction on a target block using template matching.

In an embodiment, the processing unit may determine whether to perform template matching depending on the type of slice. The slice may be the slice of the target block. For example, the processing unit may perform template matching only when the slice is a B slice. Alternatively, the processing unit may perform template matching only when the slice is a P slice or a B slice.

In an embodiment, when performing template matching, the processing unit may use a block neighboring a target block as a template. The size and location of the template may be determined based on a predefined scheme.

For example, the processing unit may use a neighboring block adjacent to the top of the target block as the template.

For example, the processing unit may use a neighboring block adjacent to the left of the target block as the template.

For example, the processing unit may use a neighboring block adjacent to the top or the left of the target block as the template.

For example, the size of the template may be (width, 4) or (4, height). The width may be the horizontal size of the target block. The height may be the vertical size of the target block.

For example, the size of the template may be (width, 8) or (8, height).

For example, the size of the template may be set based on the size of the target block. For example, the size of the template may be ½ or ¼ of the size of the target block.

In an embodiment, when performing template matching, the processing unit may search a reference picture for a block using the template. In FIG. 21, "Ref0" may be the reference picture.

The processing unit may search the reference picture for a block having the same shape and size as the template. The processing unit may derive the motion vector of the target block using the motion vector of the found block. The processing unit may set the motion vector of the found block as the motion vector of the target block.

Here, the direction of the reference picture in which the block is found and the direction of the reference picture indicated by the motion vector of the target block may be opposite each other.

For example, the processing unit may search a reference picture contained in a reference picture list L0 for the block that best matches the template of the target block.

For example, the processing unit may search a reference picture contained in a reference picture list L1 for the block that best matches the template of the target block.

For example, the processing unit may search for the block using at least one of the presented reference picture lists.

In an embodiment, the processing unit may perform a refinement for the motion vector.

For example, the processing unit may search blocks neighboring a current template and the block indicated by the derived motion vector, and may perform the refinement for motion information so that the motion vector indicates the block that best matches the template, among the found neighboring blocks. In other words, the refined motion information may be the motion vector of the block that best matches the template, among the blocks neighboring the block indicated by the derived motion vector.

In an embodiment, when performing template matching, the processing unit may derive motion information on a sub-block basis. The motion information may include motion vectors.

When motion information is derived on a sub-block basis, the processing unit may use a scheme such as the scheme for deriving motion vectors on a block basis.

For example, a sub-block, which is the unit of derivation of motion information, may be a 4×4 block. Alternatively, the sub-block may be an 8×8 block. In other words, in the derivation of motion information, the block may be split into sub-blocks having a predefined size, such as a 4×4 size or 8×8 size.

In an embodiment, sub-blocks may be blocks corresponding to a combination of one or more predefined sizes. The sub-blocks may be blocks having one or more of 4×4 and 8×8 sizes. For example, sub-blocks may be 4×4 blocks and 8×8 blocks.

In an embodiment, the processing unit may define the degree of matching between blocks when performing template matching. That is, the processing unit may use one of specific defined schemes in determining the degree of matching between blocks. One of the blocks may be a template.

For example, the processing unit may determine that, when the Sum of Absolute Differences (SAD) between two blocks is the smallest, the two blocks best match each other. That is, the processing unit may determine that, as the SAD between two blocks is smaller, the two blocks better match each other.

For example, the processing unit may determine that, when the Sum of Absolute Transformed Differences (SATD) between two blocks is the smallest, the two blocks best match each other. That is, the processing unit may determine that, as the SATD between two blocks is smaller, the two blocks better match each other.

Figure 22:
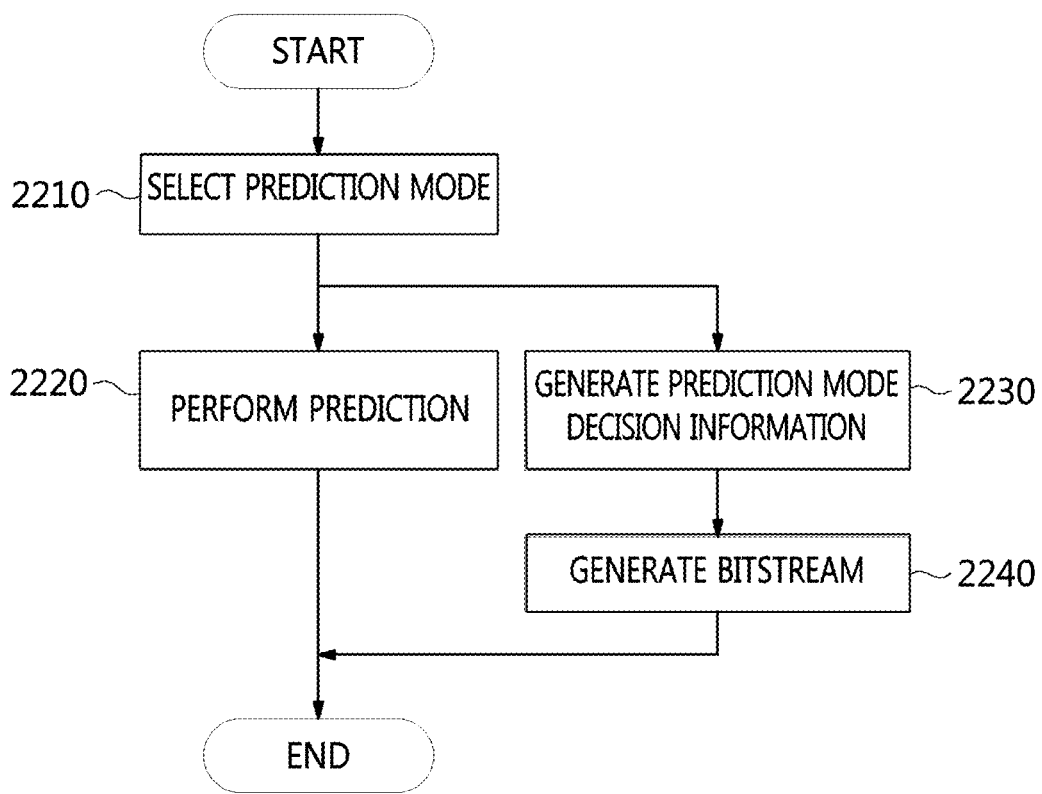
FIG. 22 is a flowchart illustrating a target block prediction method and a bitstream generation method according to an embodiment.

FIG. 22 is a flowchart illustrating a target block prediction method and a bitstream generation method according to an embodiment.

The target block prediction method and the bitstream generation method according to the present embodiment may be performed by an encoding apparatus 1200. The embodiment may be a part of a target block encoding method or a video encoding method.

At step 2210, a processing unit 1210 may select a prediction mode. Step 2210 may correspond to step 1410, described above with reference to FIG. 14.

At step 2220, the processing unit 1210 may perform prediction that uses the selected prediction mode. Step 2220 may correspond to step 1420, described above with reference to FIG. 14.

At step 2230, the processing unit 1210 may generate prediction mode decision information. The prediction mode decision information may be at least partially generated at step 2210 or 2220.

At step 2240, the processing unit 1210 may generate a bitstream.

The bitstream may include information about an encoded target block. For example, the information about the encoded target block may include transformed and quantized coefficients of the target block, and may also include coding parameters of the target block. The bitstream may include the prediction mode decision information.

The processing unit 1210 may perform entropy encoding on the prediction mode decision information, and may generate a bitstream including entropy-encoded prediction mode decision information.

The processing unit 1210 may store the generated bitstream in storage 1240. Alternatively, a communication unit 1220 may transmit the bitstream to a decoding apparatus 1300.

Figure 23:
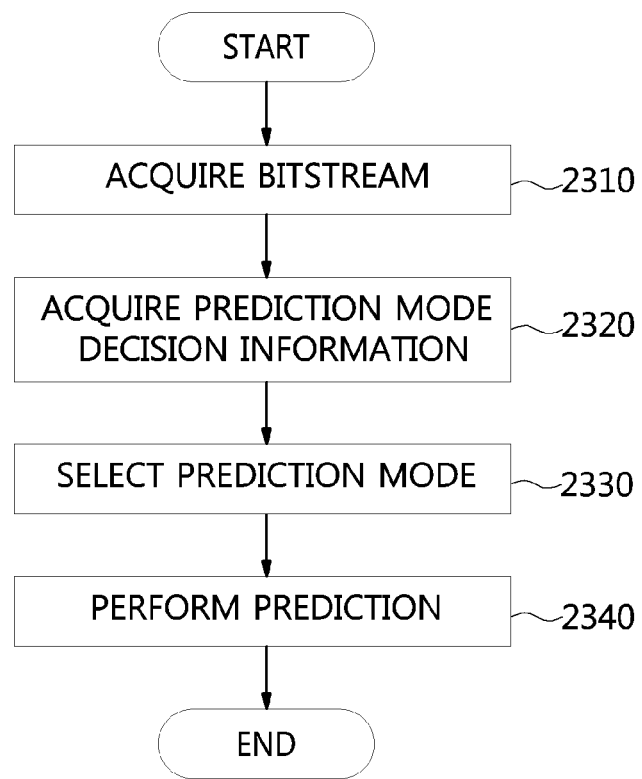
FIG. 23 is a flowchart illustrating a target block prediction method using a bitstream according to an embodiment.

FIG. 23 is a flowchart of a target block prediction method using a bitstream according to an embodiment.

The target block prediction method using a bitstream according to the present embodiment may be performed by a decoding apparatus 1300. The embodiment may be a part of a target block decoding method or a video decoding method.

At step 2310, a communication unit 1320 may acquire a bitstream. The communication unit 1320 may receive the bitstream from an encoding apparatus 1200.

The bitstream may include information about an encoded target block. For example, the information about the encoded target block may include transformed and quantized coefficients of the target block, and may also include coding parameters of the target block. The bitstream may include prediction mode decision information.

A processing unit 1310 may store the acquired bitstream in storage 1240.

At step 2320, the processing unit 1310 may acquire prediction mode decision information from the bitstream.

The processing unit 1310 may acquire the prediction mode decision information by performing entropy decoding on the entropy-encoded prediction mode decision information of the bitstream.

At step 2330, the processing unit 1310 may select a prediction mode based on the prediction mode decision information. Step 2330 may correspond to step 1410, described above with reference to FIG. 14.

At step 2340, the processing unit 1310 may perform prediction that uses the selected prediction mode. Step 2340 may correspond to step 1420, described above with reference to FIG. 14.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A video decoding method, comprising:
generating a merge list for a target block; and
performing inter prediction for the target block using the merge list,
wherein the merge list is generated based on information of a plurality of adjacent blocks spatially adjacent to the target block,
wherein the target block is composed of a plurality of sub-blocks corresponding to spatially partitioned regions of the target block, respectively,
wherein a size of the target block is greater than a size of each of the plurality of sub-blocks,
wherein the merge list is commonly used to derive initial motion vectors of the plurality of sub-blocks,
wherein a motion vector of a sub-block of the plurality of sub-blocks is derived based on an initial motion vector of the sub-block using a block matching between two blocks determined based on the initial motion vector,
wherein whether bi-directional inter prediction is used for the target block or not is checked to determine a type of prediction for the target block,
wherein the inter prediction derives the initial motion vectors of the plurality of sub-blocks using the merge list is performed in a case that the bi-directional inter prediction is used for the target block, and
wherein whether the inter prediction derives the initial motion vectors of the plurality of sub-blocks using the merge list is performed or not is determined using a difference between a Picture Order Count (POC) of a target picture comprising the target block and a POC of a reference picture for the target block.

2. A video encoding method, comprising:
generating a merge list for a target block; and
generating an index for the merge list,
wherein the merge list is generated based on information of a plurality of adjacent blocks spatially adjacent to the target block,
wherein the target block is composed of a plurality of sub-blocks corresponding to spatially partitioned regions of the target block, respectively,
wherein a size of the target block is greater than a size of each of the plurality of sub-blocks,
wherein the index indicates a candidate of the merge list which is commonly used to derive initial motion vectors of the plurality of sub-blocks in decoding of the target block,
wherein a motion vector of a sub-block of the plurality of sub-blocks is derived based on an initial motion vector of the sub-block using a block matching between two blocks determined based on the initial motion vector in the decoding of the target block,
wherein whether bi-directional inter prediction is used for the target block or not is checked to determine a type of prediction for the target block,
wherein the inter prediction derives the initial motion vectors of the plurality of sub-blocks using the merge list is performed in a case that the bi-directional inter prediction is used for the target block, and
wherein whether the inter prediction derives the initial motion vectors of the plurality of sub-blocks using the merge list is performed or not is determined using a difference between a Picture Order Count (POC) of a target picture comprising the target block and a POC of a reference picture for the target block.

3. A non-transitory computer-readable medium storing a bitstream configured by a video encoding apparatus performing a video encoding method, the video encoding method comprising:
  generating a merge list for a target block;
  generating an index for the merge list; and
  storing the bitstream comprising index information indicating the index in the non-transitory computer-readable medium,
  wherein the merge list is generated based on information of a plurality of adjacent blocks spatially adjacent to the target block,
  wherein the target block is composed of a plurality of sub-blocks corresponding spatially partitioned regions of the target block, respectively,
  wherein a size of the target block is greater than a size of each of the plurality of sub-blocks,
  wherein the index indicates a candidate of the merge list which is commonly used to derive initial motion vectors of the plurality of sub-blocks in decoding of the target block,
  wherein a motion vector of a sub-block of the plurality of sub-blocks is derived based on an initial motion vector of the sub-block using a block matching between two blocks determined based on the initial motion vector,
  wherein whether bi-directional inter prediction is used for the target block or not is checked to determine a type of prediction for the target block,
  the inter prediction to derive the initial motion vectors of the plurality of sub-blocks using the merge list is performed in a case that the bi-directional inter prediction is used for the target block, and
  wherein whether the inter prediction to derive the initial motion vectors of the plurality of sub-blocks using the merge list is performed or not is determined using a difference between a Picture Order Count (POC) of a target picture comprising the target block and a POC of a reference picture for the target block.

4. A method for sending a bitstream, the method comprising:
  sending the bitstream comprising an index for a merge list;
  wherein the index indicates a candidate of the merge list,
  wherein the merge list is generated based on information of a plurality of adjacent blocks spatially adjacent to the target block,
  wherein the target block is composed of a plurality of sub-blocks corresponding to spatially partitioned regions of the target block, respectively,
  wherein a size of the target block is greater than a size of each of the plurality of sub-blocks,
  wherein the candidate of the merge list is commonly used to derive initial motion vectors of the plurality of sub-blocks,
  wherein a motion vector of a sub-block of the plurality of sub-blocks is derived based on an initial motion vector of the sub-block using a block matching between two blocks determined based on the initial motion vector,
  wherein whether bi-directional inter prediction is used for the target block or not is checked to determine a type of prediction for the target block,
  wherein the inter prediction derives the initial motion vectors of the plurality of sub-blocks using the merge list is performed in a case that the bi-directional inter prediction is used for the target block, and
  wherein whether the inter prediction derives the initial motion vectors of the plurality of sub-blocks using the merge list is performed or not is determined using a difference between a Picture Order Count (POC) of a target picture comprising the target block and a POC of a reference picture for the target block.

5. The video decoding method of claim 1,
  wherein the plurality of adjacent blocks comprise a first block, a second block, a third block, a fourth block, a fifth block, a sixth block and a seventh block,
  wherein the first block is a left-most block among a plurality of blocks adjacent to an upper side of the target block,
  wherein the second block is a right-most block among a plurality of blocks adjacent to an upper side of the target block,
  wherein the third block is an upper-most block among a plurality of blocks adjacent to a left side of the target block,
  wherein the fourth block is a bottom-most block among a plurality of blocks adjacent to a left side of the target block,
  wherein the fifth block is diagonally adjacent to an upper-left corner of the target block,
  wherein the sixth block is diagonally adjacent to an upper-right corner of the target block, and
  wherein the seventh block is diagonally adjacent to a bottom-left corner of the target block.

6. The video decoding method of claim 1,
  wherein a motion vector for the inter prediction for the target block is derived based on information for four reference blocks, and
  wherein x-coordinates of rightmost pixels of the four reference blocks are smaller than x-coordinates of leftmost pixels of the target block.

7. The video decoding method of claim 1,
  wherein a motion vector for the inter prediction for the target block is derived based on information for seven different blocks spatially adjacent to the target block.

8. The video encoding method of claim 2,
  wherein a motion vector for the inter prediction for the target block is derived based on information for four reference blocks, and
  wherein x-coordinates of rightmost pixels of the four reference blocks are smaller than x-coordinates of leftmost pixels of the target block.

9. The video encoding method of claim 2,
  wherein a motion vector for the inter prediction for the target block is derived based on information for seven different blocks spatially adjacent to the target block.

10. The method of claim 4,
  wherein the plurality of adjacent blocks comprise a first block, a second block, a third block, a fourth block, a fifth block, a sixth block and a seventh block,
  wherein the first block is a left-most block among a plurality of blocks adjacent to an upper side of the target block,
  wherein the second block is a right-most block among a plurality of blocks adjacent to an upper side of the target block,
  wherein the third block is an upper-most block among a plurality of blocks adjacent to a left side of the target block, wherein the fourth block is a bottom-most block among a plurality of blocks adjacent to a left side of the target block, wherein the fifth block is diagonally adjacent to an upper-left corner of the target block, wherein the sixth block is diagonally adjacent to an upper-right corner of the target block, and wherein the seventh block is diagonally adjacent to a bottom-left corner of the target block.

11. The method of claim 4, wherein a motion vector for the inter prediction for the target block is derived based on information for four reference blocks, and wherein x-coordinates of rightmost pixels of the four reference blocks are smaller than x-coordinates of leftmost pixels of the target block.

12. The method of claim 4, wherein a motion vector for the inter prediction for the target block is derived based on information for seven different blocks spatially adjacent to the target block.

13. The video decoding method of claim 1, wherein the number of rows of the plurality of sub-blocks in the target block is 4, and wherein the number of columns of the plurality of sub-blocks in the target block is 4.

14. The video encoding method of claim 2, wherein the number of rows of the plurality of sub-blocks in the target block is 4, and wherein the number of columns of the plurality of sub-blocks in the target block is 4.

15. The method of claim 4, wherein the number of rows of the plurality of sub-blocks in the target block is 4, and wherein the number of columns of the plurality of sub-blocks in the target block is 4.

16. The video decoding method of claim 1, wherein the block matching is performed using a Sum of Absolute Differences (SAD) between the two blocks.

17. The video encoding method of claim 2, wherein the block matching is performed using a Sum of Absolute Differences (SAD) between the two blocks.

18. The method of claim 4, wherein the block matching is performed using a Sum of Absolute Differences (SAD) between the two blocks.

\* \* \* \* \*